United States Patent
Umeda et al.

(10) Patent No.: US 10,097,058 B2
(45) Date of Patent: Oct. 9, 2018

(54) ROTARY ELECTRIC MACHINE

(71) Applicant: MITSUBISHI ELECTRIC CORPORATION, Chikyoda-ku (JP)

(72) Inventors: Takashi Umeda, Chiyoda-ku (JP); Akira Hashimoto, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 288 days.

(21) Appl. No.: 15/109,753

(22) PCT Filed: Feb. 14, 2014

(86) PCT No.: PCT/JP2014/053439
§ 371 (c)(1),
(2) Date: Jul. 5, 2016

(87) PCT Pub. No.: WO2015/121960
PCT Pub. Date: Aug. 20, 2015

(65) Prior Publication Data
US 2016/0329767 A1   Nov. 10, 2016

(51) Int. Cl.
*H02K 3/28* (2006.01)
*H02K 1/14* (2006.01)
*H02K 1/16* (2006.01)
*H02K 1/27* (2006.01)
*H02K 3/12* (2006.01)

(52) U.S. Cl.
CPC ............... *H02K 3/28* (2013.01); *H02K 1/146* (2013.01); *H02K 1/16* (2013.01); *H02K 1/2706* (2013.01); *H02K 3/12* (2013.01); *H02K 2213/03* (2013.01)

(58) Field of Classification Search
CPC .................. H02K 3/28; H02K 3/12
USPC ........................ 310/180, 201, 208
See application file for complete search history.

(56) References Cited

U.S. PATENT DOCUMENTS 8,344,572 B2 * 1/2013 Moellgaard .............. H02K 3/28
                                                                310/179
2002/0047449 A1     4/2002 Kim et al.

FOREIGN PATENT DOCUMENTS

| JP | 63-31439 A | 2/1988 |
| JP | 63-87146 A | 4/1988 |
| JP | 9-37525 A | 2/1997 |
| JP | 11-98743 A | 4/1999 |

(Continued)

OTHER PUBLICATIONS

International Search Report dated May 20, 2014 in PCT/JP2014/053439 Filed Feb. 14, 2014.

*Primary Examiner* — Terrance Kenerly
(74) *Attorney, Agent, or Firm* — Xsensus, LLP

(57) ABSTRACT

In a rotary electric machine, an armature core includes a plurality of magnetic pole teeth and slots are formed between the magnetic pole teeth. An armature coil group includes a plurality of armature coils each including a pair of coil sides arranged in the slots, which are different from one another, and coil ends connecting the pair of coil sides. The armature coil group includes, as the armature coils, a plurality of base coils, of which one coil side is arranged in an upper opening of the slot and the other coil side is arranged in a lower opening of the slot, upper layer coils, of which both one coil side and the other coil side are arranged in an upper opening of the slot, and lower layer coils, of which both one coil side and the other coil side are arranged in the lower opening of the slot.

7 Claims, 22 Drawing Sheets

(56) References Cited

FOREIGN PATENT DOCUMENTS

| JP | 2002-44893 A | 2/2002 |
|----|--------------|--------|
| JP | 2013-13187 A | 1/2013 |
| WO | 2015/128964 A1 | 9/2015 |

* cited by examiner

| ORDER NUMBER | WINDING FACTOR (Kd) |
|---|---|
| 1 (FUNDAMENTAL WAVE) | 0.923 |
| 5 | 0.051 |
| 7 | 0.038 |
| 11 | 0.098 |
| 13 | -0.089 |

FIG. 10

| ORDER NUMBER | WINDING FACTOR (Kd) |
|---|---|
| 1 (FUNDAMENTAL WAVE) | 0.937 |
| 5 | 0.100 |
| 7 | 0.008 |
| 11 | 0.235 |
| 13 | -0.122 |

| ORDER NUMBER | WINDING FACTOR (Kd) |
|---|---|
| 1 (FUNDAMENTAL WAVE) | 0.942 |
| 5 | 0.127 |
| 7 | 0.050 |
| 11 | 0.035 |
| 13 | -0.059 |

FIG. 18

| ORDER NUMBER | WINDING FACTOR (Kd) |
|---|---|
| 1 (FUNDAMENTAL WAVE) | 0.954 |
| 5 | 0.186 |
| 7 | -0.129 |
| 11 | -0.075 |
| 13 | 0.059 |

| ORDER NUMBER | WINDING FACTOR (Kd) |
|---|---|
| 1 (FUNDAMENTAL WAVE) | 0.943 |
| 5 | 0.010 |
| 7 | 0.346 |
| 11 | -0.162 |
| 13 | 0.064 |

FIG. 25

| ORDER NUMBER | WINDING FACTOR (Kd) |
|---|---|
| 1 (FUNDAMENTAL WAVE) | 0.916 |
| 5 | 0.136 |
| 7 | 0.273 |
| 11 | 0.107 |
| 13 | 0.154 |

ROTARY ELECTRIC MACHINE

TECHNICAL FIELD

This invention relates to a rotary electric machine having an armature and a rotor which rotates with respect to the armature.

BACKGROUND ART

Conventionally, a rotary electric machine is known in which a plurality of armature coils are wound in a two-layer overlap winding configuration on a plurality of magnetic pole teeth of an armature core. Furthermore, conventionally, a method of manufacturing an armature has been proposed in which, in order to achieve easier winding of the armature coils on the armature core, the wires of the armature coil are sequentially inserted into respective slots of the armature core, for each phase, without aligning the mode of the coil ends in each coil (see, for example, PTL 1).

CITATION LIST

Patent Literature

[PTL 1] Japanese Patent Application Publication No. H11-98743

SUMMARY OF INVENTION

Technical Problem

However, since the coil ends of the armature coils are arranged in a complex fashion, then when inserting the wires of an armature coil into the slots of the armature core, the coil ends of the adjacent armature coils form an obstacle. Avoiding interference between coil ends involves adjustment of the coil lengths and work for shaping the coil ends, and so on, and thus is envisaged to make the work of winding the armature coils on the armature core more difficult.

The present invention was devised in view of the problem described above, an object thereof being to obtain a rotary electric machine which has good operating characteristics and which can be manufactured easily.

Solution to Problem

The rotary electric machine according to this invention is a rotary electric machine, comprising: an armature core having a plurality of magnetic pole teeth provided at intervals apart in a circumference direction, slots being formed between the magnetic pole teeth; an armature coil group having a plurality of armature coils each including a pair of coil sides arranged in the slots, which are different from one another, and coil ends connecting the pair of coil sides, the armature coils being wound on the magnetic pole teeth in an overlap winding configuration, and a three-phase current flowing in the armature coils; and a rotor having a plurality of magnetic poles aligned in the circumference direction, the rotor being rotated with respect to the armature core and the armature coil group, wherein the armature coil group has, as the armature coils, a plurality of base coils, of which one coil side is arranged in an upper opening of the slot and the other coil side is arranged in a lower opening of the slot, upper layer coils, of which both one coil side and the other coil side are arranged in the upper opening of the slot, and lower layer coils, of which both one coil side and the other coil side are arranged in the lower opening of the slot, taking N to be a natural number equal to or greater than 2, the number of slots per pole q', which is the number of the slots for each of the magnetic poles, satisfies a relationship $N<q'<N+1$, the coil ends of the base coils span $N+1$ of the magnetic pole teeth in an inclined state in the same direction with respect to the circumference direction of the armature core, the coil ends of the upper layer coils and the lower layer coils span N of the magnetic pole teeth, supposing a virtual base coil installation state in which the coil sides of a plurality of virtual base coils having the same configuration as the base coils are arranged in all of the upper openings and lower openings of each of the slots, and two of the virtual base coils which have a relationship whereby the currents flowing in two of the coil sides which are respectively arranged in the upper openings of two slots situated on either side of N magnetic pole teeth are currents of the same phase and opposite directions, are defined as virtual specific coils, and virtual coil pairs configured by the two virtual specific coils are created at uniform intervals in the circumference direction of the armature core, at least any one of the virtual coil pairs is taken as an object, and the base coils are arranged so as to avoid the positions of all of the virtual specific coils constituting the virtual coil pair that is the object, and the coil sides of the upper layer coils and lower layer coils are arranged at the positions of the coil sides of the virtual specific coils where the arrangement of the base coils has been avoided.

According to the rotary electric machine of the present invention, it is possible to achieve good operating characteristics and to facilitate manufacture.

BRIEF DESCRIPTION OF DRAWINGS

FIG. 10 is a table showing the winding factor Kd of the rotary electric machine in FIG. 8.

FIG. 18 is a table showing the winding factor Kd of the rotary electric machine according to the second comparative example.

FIG. 25 is a table showing the winding factor Kd of the rotary electric machine in FIG. 23.

DESCRIPTION OF EMBODIMENTS

A preferred embodiment of this invention is described below with reference to the drawings.

First Embodiment

Figure 1:
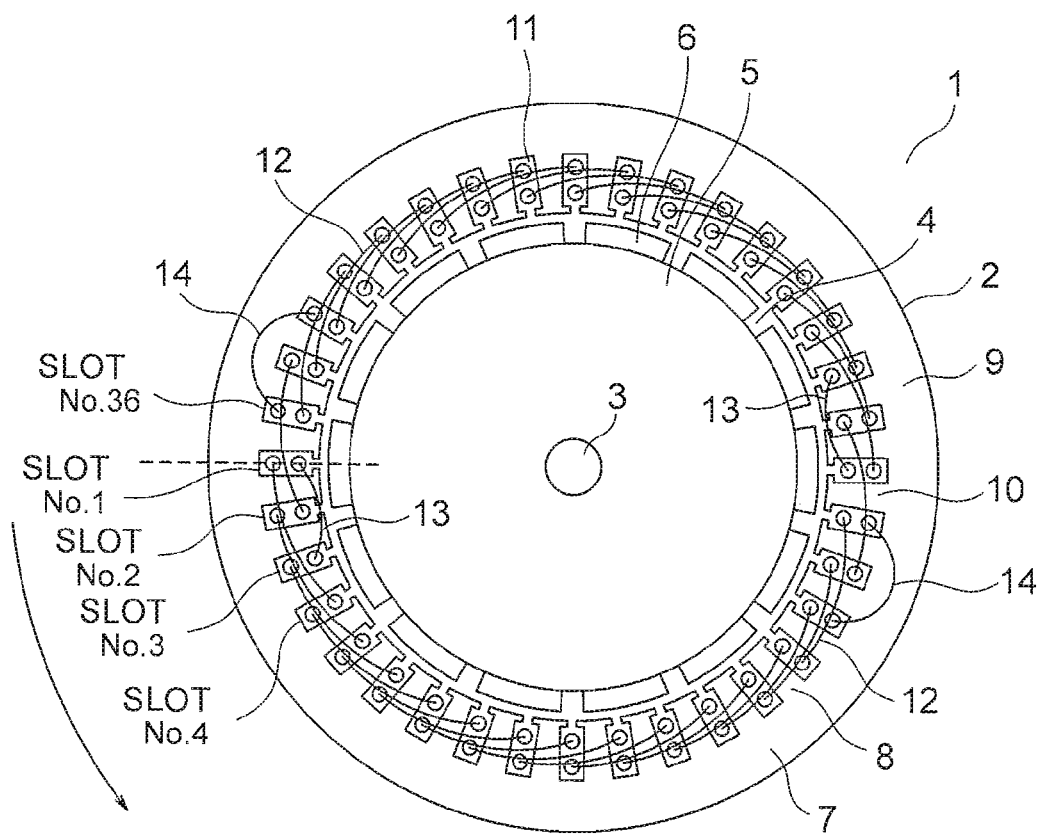
FIG. 1 is a schematic drawing showing a rotary electric machine according to a first embodiment of this invention.

FIG. 1 is a schematic drawing showing a rotary electric machine according to a first embodiment of this invention. In FIG. 1, an rotary electric machine 1 has a cylindrical armature (stator) 2, a rotary shaft 3 disposed on the axis line of the armature 2, and a rotor 4 which is fixed to the rotary shaft 3 and rotates with respect to the armature 2 in unison with the rotary shaft 3.

The rotor 4 is disposed on the inside of the armature 2. Furthermore, the rotor 4 has a cylindrical rotor core 5 made from a magnetic material (for example, iron) and a plurality of magnets 6 provided on the outer circumferential surface of the rotor core 5 (the surface opposing the inner circumferential surface of the armature 2). The magnets 6 are disposed at intervals apart in the circumference direction of the rotor core 5. A plurality of magnetic poles which are aligned in the circumference direction of the rotor core 5 are formed in the rotor 4 by the magnets 6. In this example, 14 magnets 6 are provided on the outer circumferential surface of the rotor core 5, and the number of magnetic poles P of the rotor 4 is 14.

The armature 2 has an armature core 7 made from a magnetic material (for example, iron), and an armature coil group 8 provided on the armature core 7.

The armature core 7 has a cylindrical back yoke 9, and a plurality of magnetic pole teeth 10 which protrude in an inward radial direction (towards the rotor 4) from the inner circumferential portion of the back yoke 9. The magnetic pole teeth 10 are provided at intervals apart in the circumference direction of the armature core 7. Therefore, a slot 11 which is open in the inward radial direction of the armature core 7 (towards the rotor 4) is formed between each of the magnetic pole teeth 10. In the armature core 7, the number of magnetic pole teeth 10 and the number of slots 11 (slot number) Q are the same. In this example, the number of magnetic pole teeth 10 and the number of slots Q are both 36.

Here, for the sake of convenience, the slot 11 which is positioned horizontally to the left-hand side from the center of the rotary shaft 3 in the FIG. 1 is taken as a reference slot, and the number of this reference slot 11 is taken to be "No. 1". Furthermore, the other slots 11 are numbered sequentially in counter-clockwise order, No. 2, No. 3, . . . No. 36, from the reference slot No. 1 in FIG. 1. Moreover, the magnetic pole tooth 10 positioned between the No. 1 and No. 2 slots 11 in FIG. 1 is taken to be "No. 1", and the other magnetic pole teeth 10 are numbered sequentially in counter-clockwise order, No. 2, No. 3, . . . , No. 36, from the No. 1 magnetic pole tooth 10.

Furthermore, the number of slots per pole (number of slots 11 for each magnetic pole of the rotor 4) q', which is a coefficient indicating the relationship between the number of slots Q and the number of magnetic poles P, is expressed by Formula (1) below.

$$q'=Q/P \qquad (1)$$

Consequently, in this example, the value of the number of slots per pole q' is $36/14=18/7 \cong 2.57$.

Figure 2:
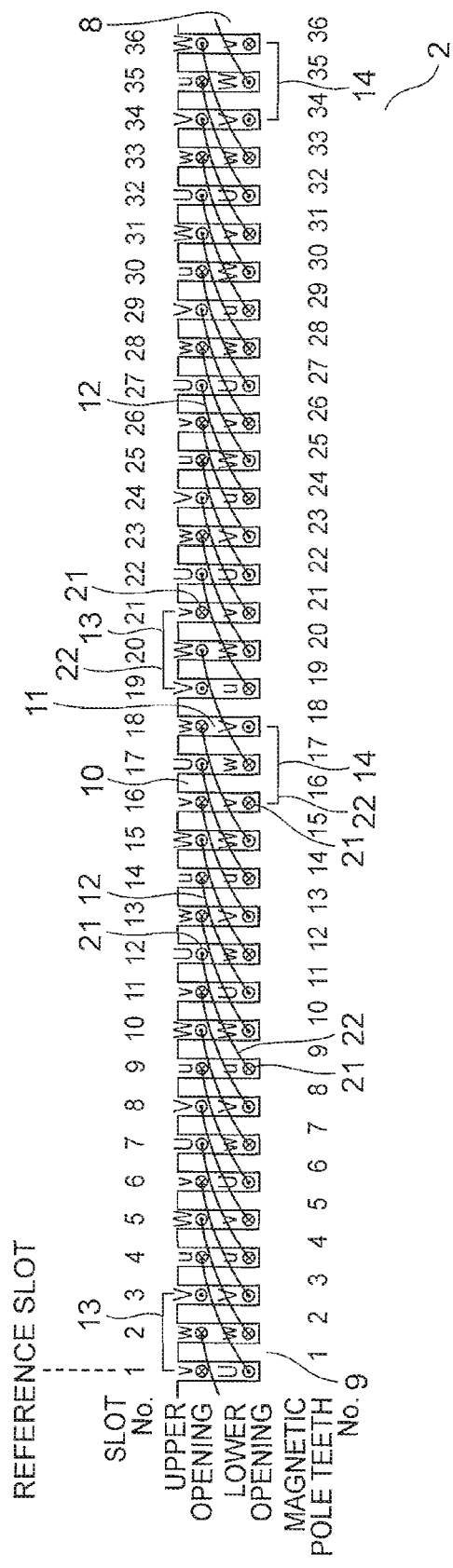
FIG. 2 is an exploded diagram showing the armature in FIG. 1.

FIG. 2 is an exploded diagram showing the armature 2 in FIG. 1. The armature coil group 8 includes, as armature coils, a plurality of base coils 12, a plurality of upper layer coils 13 and a plurality of lower layer coils 14.

The base coils 12, upper layer coils 13 and lower layer coils 14 are each configured by a bundle of conducting wires wound together on a plurality of magnetic pole teeth 10. More specifically, the base coils 12, upper layer coils 13 and lower layer coils 14 are each wound in overlapped fashion on the magnetic pole teeth 10. Furthermore, the type and number of turns of the conducting wire bundles constituting each of the base coils 12, upper layer coils 13 and lower layer coils 14 are all the same.

Each of the base coils 12, upper layer coils 13 and lower layer coils 14 has a pair of coil sides 21 which are disposed in mutually different slots 11, and a pair of coil ends 22 which connect the pair of coil sides 21 by spanning across a plurality of magnetic pole teeth 10. The coil sides 21 are substantially straight line portions following the slots 11. The coil ends 22 connect between the end portions of the coil sides 21 on the outer side in terms of the axis line direction of the armature core 7.

Each of the slots 11 includes an upper opening (upper layer) and a lower opening (lower layer), which are spaces for arranging the coil sides 21, in the depth direction of the slot 11. The upper opening of the slot 11 is positioned towards the inner radial side of the armature core 7 (towards the open side of the slot 11), with respect to the lower opening of the slot 11.

Each of the base coils 12 is provided on the armature core 7 such that one coil side 21 is disposed in the upper opening of the slot 11, and the other coil side 21 is disposed in the lower opening of the slot 11. Furthermore, the coil ends 22 of each base coil 12 span between a plurality of magnetic pole teeth 10, in an inclined state in the same direction with respect to the circumference direction of the armature core 7.

If the number of magnetic pole teeth 10 spanned by the coil ends 22 (in other words, the number of magnetic pole teeth 10 between one coil side 21 and the other coil side 21 of the same coil) is taken to be the coil pitch, then the coil pitch of the base coils 12 is the same in each of the base coils 12. The base coils 12 are long-wound coils which have a coil pitch greater than the number of slots per pole q'.

The upper layer coils 13 are each provided on the armature core 7 such that the one coil side 21 and the other coil side 21 thereof are both disposed in the upper opening of a slot 11. The lower layer coils 14 are each provided on the armature core 7 such that the one coil side 21 and the other coil side 21 thereof are both disposed in the lower opening of a slot 11.

In FIG. 2, the phases of the current flowing respectively in the base coils 12, the upper layer coils 13 and the lower layer coils 14 are indicated by U, V and W. Furthermore, in FIG. 2, the direction of the current flowing in each of the coil sides 21 is indicated by an uppercase or lowercase U, V, W, and a black circle and cross symbol inside the white circle that indicates the coil side 21. Therefore, the direction of winding of coils 12, 13, 14 is understood to be the direction of the current in each coil side 21.

Here, in order to specify the positions of each of the base coils 12, upper layer coils 13 and lower layer coils 14 in the rotary electric machine 1 according to the present embodiment, a rotary electric machine according to a first comparative example which does not include the upper layer coils 13 and the lower layer coils 14 is envisaged.

Figure 3:
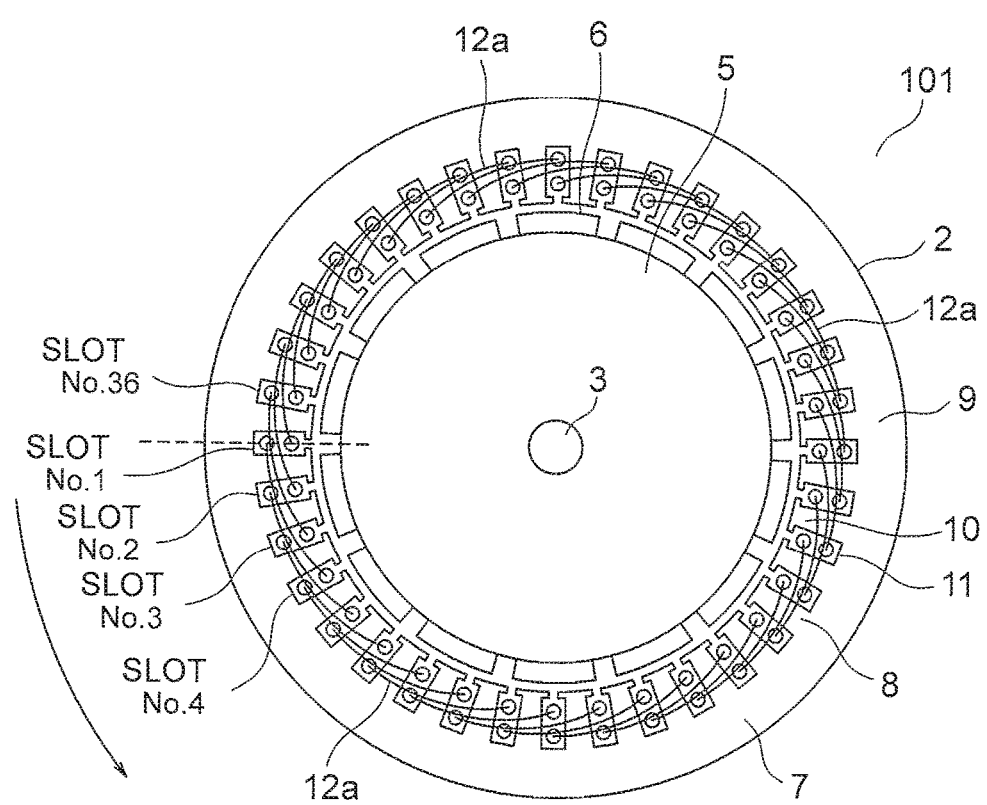
FIG. 3 is a schematic drawing showing a rotary electric machine according to a first comparative example.
Figure 4:
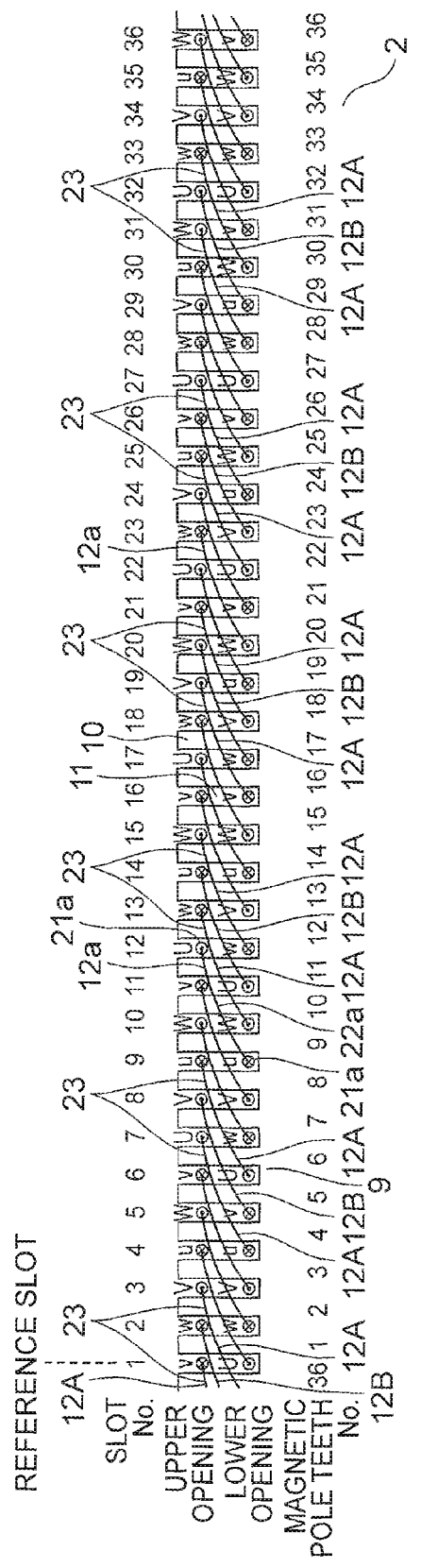
FIG. 4 is an exploded diagram showing the armature of the rotary electric machine in FIG. 3.
Figures 5, 6:
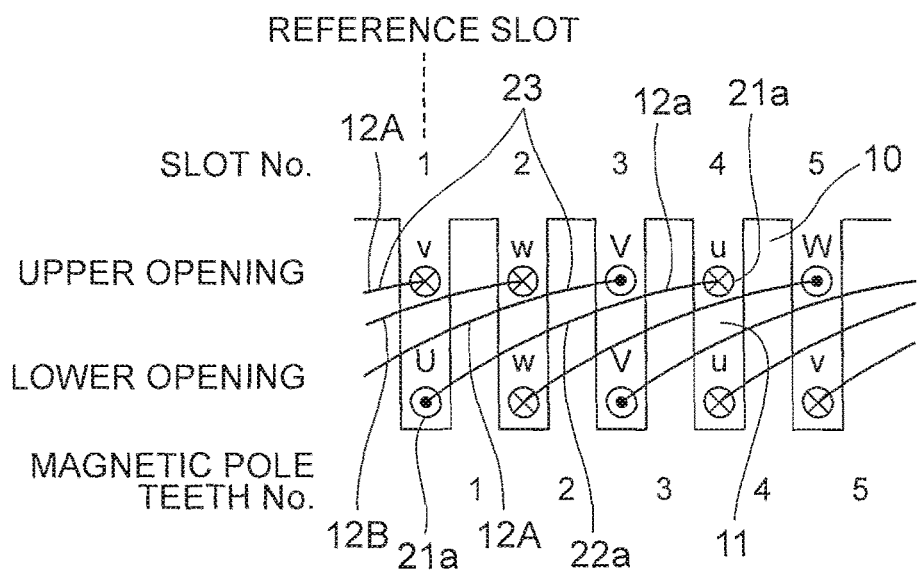
FIG. 5 is a principal enlarged diagram showing the armature of the rotary electric machine in FIG. 4.
FIG. 6 is a table showing the winding factor Kd of the rotary electric machine according to the first comparative example.

FIG. 3 is a schematic drawing showing a rotary electric machine 101 according to the first comparative example. Furthermore, FIG. 4 is an exploded diagram showing an armature 2 of the rotary electric machine 101 in FIG. 3. Moreover, FIG. 5 is a partial enlarged diagram showing an armature 2 of the rotary electric machine 101 in FIG. 4. In FIG. 4 and FIG. 5, the phase of the current flowing in each coil, and the direction of the current flowing in each coil side, are indicated by the same method as in FIG. 2.

The configuration of the rotary electric machine 101 according to the first comparative example is the same as the configuration of the rotary electric machine 1 according to the first embodiment, apart from the configuration of the armature coil group 8. The armature coil group 8 includes only a plurality of virtual base coils 12a having the same configuration as the base coils 12. The virtual base coils 12a each have a pair of coil sides 21a, which are of the same configuration as the coil sides 21 of the base coils 12, and a pair of coil ends 22a, which are of the same configuration as the coil ends 22 of the base coils 12.

Each of the virtual base coils 12a is provided in regular fashion on the armature core 7 such that one coil side 21a is disposed in the upper opening of a slot 11, and the other coil side 21a is disposed in the lower opening of a slot 11. The coil sides 21a of the virtual base coils 12a are all arranged in the upper openings and lower openings of the slots 11. Therefore, the state of the armature 2 of the rotary electric machine 101 according to the first comparative example is a virtual base coil installation state in which the virtual base coils 12a are arranged in regular fashion on the armature core 7, in a two-layer overlap winding configuration.

The ideal state of a rotary electric machine is one where the magnitude of the combined vectors of the induced voltages created by each of the armature coils in the U phase, V phase and W phase are the same, and the combined vectors of the induced voltages of each phase are distributed with a phase differential of 120° in the electrical angle. Consequently, in the rotary electric machine 101 according to the first comparative example, the current phase (U phase, V phase, W phase) connected to each virtual base coil 12a, and the direction of winding of each virtual base coil 12a are selected so as to achieve the ideal state of the rotary electric machine. In the rotary electric machine 101, a substantially sinusoidal induced voltage corresponding to the magnetic flux created by the magnetic poles of the rotor 4 is generated, by respectively adjusting the arrangement sequence of the virtual base coils 12a of each phase, and the winding direction of each virtual base coil 12a.

In FIG. 4, looking separately at the No. 1 to No. 18 slots 11 and the No. 19 to No. 36 slots 11, it can be seen that the arrangement of the virtual base coils 12a of each phase is the same, except that the direction of the current flowing in the coil sides 21a is opposite. This is because the value of the number of slots per pole p' of the rotary electric machine 101 according to the first comparative example is 18/7. In other words, in the armature 2 according to the first comparative example, since one set is formed by 7 magnetic poles corresponding to 18 slots 11, then the arrangement of the virtual base coils 12a of the respective phases is repeated every 18 slots 11.

In the virtual base coil installation state in which the virtual base coils 12a are arranged regularly on the armature core 7 in a two-layer overlap winding configuration, if N is taken to be a natural number equal to or greater than 2, and if the number of slots per pole q' satisfies formula (2) below, then by adjusting the current phases, the U phase, V phase and W phase, and the direction of winding of each of the virtual base coils 12a, it is possible to create, at fixed intervals apart, virtual coil pairs 23 which are each configured by two virtual base coils 12a having a specific relationship in terms of the current phase and current direction. If the two virtual base coils 12a constituting virtual coil pairs 23 are each called virtual specified coils 12A, then the relationship between the two virtual specific coils 12A included in the same virtual coil pair 23 is such as that the currents flowing in the two coil sides 21a arranged in the upper openings (or lower openings) of the two slots 11 having N magnetic pole teeth 10 therebetween will be currents of the same phase and opposite directions.

$$N<q'<N+1 \qquad (2)$$

This is because the arrangement of the virtual base coils 12a is determined in order to achieve an ideal state in which that sizes of the combined vectors of the induced voltages created by the virtual base coils 12a of the U phase, V phase and W phase are the same, for each phase, and the phase differential between the combined vectors is distributed at 120°.

The value of the number of slots q' per pole is approximately 2.57, as described above, which is greater than 2 and smaller than 3 (2<q'<3). Therefore, from Formula (2), it can be seen that the configuration of the armature 2 of the rotary electric machine 101 according to the first comparative example is a configuration of an armature 2 where N=2. The virtual base coils 12a are coils in which the coil ends 22a span N+1 magnetic pole teeth 10. Therefore, in this example, the coil pitch of the virtual base coils 12a is three.

Looking at the V phase, it can be seen that a set of coil sides 21a in which currents of the same phase are flowing in opposite directions are arranged respectively in the upper openings of the No. 1 and No. 3 slots 11, the lower openings of the No. 16 and No. 18 slots 11, the upper openings of the No. 19 and No. 21 slots 11, and the lower openings of the No. 34 and No. 36 slots 11. Furthermore, it can be seen that the distance between the No. 1 and No. 3 slots 11 and the No. 19 and No. 21 slots 11, in whose upper openings the sets of coil sides 21a passing currents of the same phase and opposite direction are situated, is equivalent to 18 slots, and the distance between the No. 16 and No. 18 slots 11 and the No. 34 and No. 36 slots 11, in whose lower openings the sets of coil sides 21a passing currents of the same phase and opposite direction are situated, is also equivalent to 18 slots. Moreover, it can be seen that the coil sides 21a respectively in the upper openings of the No. 1 and No. 3 slots 11, and in the lower openings of the No. 34 and No. 36 slots 11 are coil sides 21a of the same two virtual base coils 12a, and the coil sides 21a respectively in the upper openings of the No. 19 and No. 21 slots 11 and the lower openings of the No. 16 and No. 18 slots 11 are coil sides 21a of the same two virtual base coils 12a. For this reason, in FIG. 2, it can be seen that two virtual base coils 12A which have a relationship whereby currents of the same phase and opposite directions are flowing in the two coil sides 21a in the upper openings (or lower openings) of two slots 11 having two (N=2) magnetic pole teeth 10 therebetween are respectively called virtual specific coils 12A, and a V-phase virtual coil pair 23 configured by two virtual specific coils 12A is arranged at an interval of 18 slots apart. Furthermore, in the case of the U phase and the W phase, similarly to the V phase, it can be seen that a virtual coil pair 23 is arranged at an interval of 18 slots apart.

The sequence of the current phases in each of the virtual coil pairs 23 which are present at uniform intervals apart repeats the phases (U phase, V phase, W phase) in the same order. In the virtual base coil 12a in FIG. 2, taking the coil side 21a in the upper opening of the slot 11 as a reference, the virtual coil pair 23 having two coil sides 21a in the upper openings of No. 1 and No. 3 is in the V phase, the virtual coil pair 23 having two coil sides 21a in the upper openings of No. 7 and No. 9 is in the U phase, and the virtual coil pair 23 having two coil sides 21a in the upper openings of No. 13 and No. 15 is in the W phase, and hence the phases are repeated in the sequence, V phase, U phase and W phase.

FIG. 6 is a table showing the winding factor Kd of the rotary electric machine 101 according to the first comparative example. The winding factor Kd is an index which expresses the characteristics of the rotary electric machine, and the nearer the value of the fundamental wave component to 1, the better the torque characteristics, and the smaller the value of the high-order components, such as fifth and seventh-order components, etc., the smaller the high-frequency vibration, and the better the operating characteristics of the rotary electric machine. In the rotary electric machine 101 according to the first comparative example, it can be seen that the value of the winding factor Kd tends to be good in terms of both the fundamental wave component and the high-order components.

In the rotary electric machine 1 according to the present embodiment, when FIG. 2 is compared with FIG. 4, the base coils 12 are arranged so as to avoid the positions of all of the virtual specific coils 12A which constitute the V-phase virtual coil pairs 23 (in this example, the four virtual specific coils 12A having coil sides 21a which are arranged respectively in the upper openings of the No. 1, No. 3, No. 19 and No. 21 slots 11), among the virtual coil pairs 23. In this example, the base coils 12 are arranged in all of the positions of the virtual base coils 12a, except for the positions of these virtual specific coils 12A in the V-phase virtual coil pairs 23 (a total of four positions).

The coil ends 22 of the base coils 12 span N+1 magnetic pole teeth 10. In other words, the coil pitch of the base coils 12 is N+1. In this example, since N=2, then the coil pitch of the base coils 12 is three.

The coil sides 21 of the upper layer coils 13 and the lower layer coils 14 are arranged at the positions of the respective coil sides 21a of the virtual specific coils 12A, where arrangement of the base coils 12 is avoided. Therefore, the upper layer coils 13 and the lower layer coils 14 are arranged, one each, for each of the virtual coil pairs 23, where arrangement of the base coils 12 is avoided. Therefore, the number of the upper layer coils 13 and the number of the lower layer coils 14 included in the armature coil group 8 are the same. Furthermore, the coil ends 22 of the upper layer coils 13 and the lower layer coils 14 span N magnetic pole teeth 10. In other words, the coil pitches of the upper layer coils 13 and the lower layer coils 14 are both N (in this example, N=2).

The current phase of the upper layer coils 13 is set to the same phase as the current phase of the virtual coil pair 23 having coil sides 21a corresponding to the coil sides 21 of the upper layer coils 13 (in this example, the V phase). Furthermore, the winding direction of the upper layer coils 13 is determined in such a manner that the direction of the current flowing in the coil sides 21 of the upper layer coils 13 is the same as the direction of the current flowing in the coil sides 21a of the virtual specific coils 12A.

The current phase of the lower layer coils 14 is set to the same phase as the current phase of the virtual coil pair 23 having coil sides 21a corresponding to the coil sides 21 of the lower layer coils 14 (in this example, the V phase). Furthermore, the winding direction of the lower layer coils 14 is determined in such a manner that the direction of the current flowing in the coil sides 21 of the lower layer coils 14 is the same as the direction of the current flowing in the coil sides 21a of the virtual specific coils 12A.

In this example, two each of the upper layer coils 13 and the lower layer coils 14 are included in the armature coil group 8. Furthermore, in this example, the coil sides 21 of one upper layer coil 13 are arranged in the upper openings of the No. 1 and No. 3 slots 11, and the coil sides 21 of the other upper layer coil 13 are arranged in the upper openings of the No. 19 and No. 21 slots 11. Moreover, in this example, the coil sides 21 of one lower layer coil 14 are arranged in the lower openings of the No. 34 and No. 36 slots 11, and the coil sides 21 of the other lower layer coil 14 are arranged in the lower openings of the No. 16 and No. 18 slots 11.

In other words, the armature 2 according to the present embodiment is configured such that, supposing a virtual base coil installation state (FIG. 4) in which all of the coil sides 21a of the virtual base coils 12a are arranged regularly in all of the upper openings and lower openings of the slots 11, then as shown in FIG. 2, the base coils 12 are disposed in all of the positions of the virtual base coils 12a, apart from the positions of the virtual specific coils 12A which are included in the V-phase virtual coil pair 23, and the coil sides 21 of upper layer coils 13 and lower layer coils 14 are arranged at the positions of the coil sides 21a of the virtual specific coils 12A, where the base coils 12 are not arranged. Comparing FIG. 2 with FIG. 4, it can be seen that the armature 2 of the present embodiment is different to the armature 2 of the first comparative example in that a portion of the base coils 12 are eliminated and the upper layer coils 13 and lower layer coils 14 are added, but the present embodiment is the same as the first comparative example in respect of the arrangement of the coil sides 21 in the upper openings and lower openings of the slots 11. Consequently, the induced voltage created by the armature 2 according to the present embodiment is the same as the induced voltage created by the armature 2 of the first comparative example.

When the base coils 12, upper layer coils 13 and lower layer coils 14 are wound on the armature core 7, firstly, after winding the lower layer coils 14 on the armature core 7, the base coils 12 are wound sequentially in the circumference direction of the armature core 7. In this case, the base coil 12 having coil sides 21 disposed between the coil sides 21 of an upper layer coil 13 and between the coil sides 21 of a lower layer coil 14 (in this example, the base coil 12 having a coil side 21 disposed in the upper opening of the No. 20 slot 11) is wound last onto the armature core 7.

When the last base coil 12 is wound onto the armature core 7, a portion of the base coils 12 already wound on the armature core 7 (in this example, the base coils 12 having coil sides 21 arranged respectively in the No. 17 and No. 18 slots, for instance) will be covering the scheduled winding positions of the last base coil 12, and therefore the last base coil 12 is wound onto the armature core 7 after first carrying out a task of bending this portion of base coils 12 to remove the coil sides 21 thereof from the upper openings of the slots 11 (coil raising task). Thereupon, when the bent portion of base coils 12 are returned to their original positions, the upper layer coils 13 are finally wound onto the armature core 7. In this way, the base coils 12, upper layer coils 13 and lower layer coils 14 are wound onto the armature core 7.

In the rotary electric machine 1 of this kind, since the base coils 12 are arranged so as to avoid the positions of all of the virtual specific coils 12A constituting the V-phase virtual coil pairs 23, among the respective virtual coil pairs 23, and since the coil sides 21 of the upper layer coils 13 and the lower layer coils 14 are arranged at the positions of the coil sides 21 of the virtual specific coils 12A where arrangement of the base coils 12 is avoided, then the number of coil ends 22 spanning the magnetic pole teeth 10 positioned between the upper layer coils 13 and the lower layer coils 14 can be made smaller than the number of coil ends 22a spanning the magnetic pole teeth 10 in the first comparative example. Consequently, when winding the base coils 12 on the armature core 7, it is possible to reduce the number of base coils 12 which are bent in order to wind the last base coil 12 onto the armature core 7, compared to the first comparative example. Furthermore, it is also possible to avoid complication of the arrangement of the coil ends 22 of the base coils 12, upper layer coils 13 and lower layer coils 14. Therefore, the base coils 12, upper layer coils 13 and lower layer coils 14 can be wound easily onto the armature core 7, and the manufacture of the rotary electric machine 1 can be simplified. Furthermore, by eliminating base coils 12 in order to facilitate the winding of the base coils 12 onto the armature core 7, the torque characteristics of the rotary electric machine 1 are degraded, but by including upper layer coils 13 and lower layer coils 14 in the armature coil group 8, it is possible to achieve satisfactory operating characteristics of the rotary electric machine 1. In other words, it is possible to facilitate the manufacture of a rotary electric machine 1 which has good operating characteristics.

Second Embodiment

Figure 7:
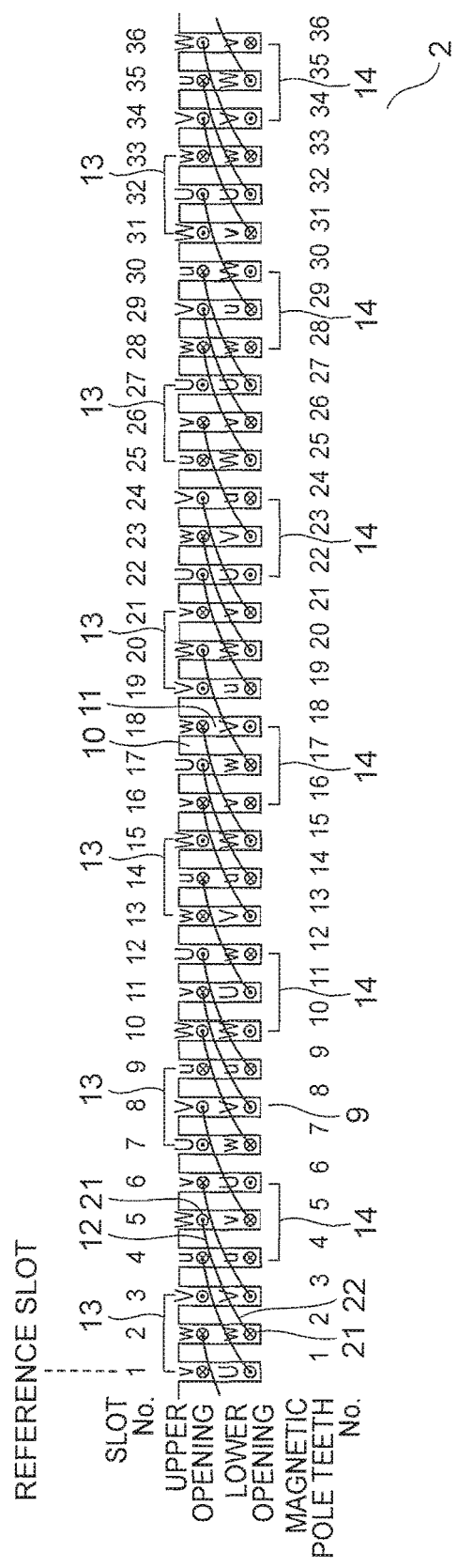
FIG. 7 is an exploded diagram showing the armature of a rotary electric machine according to a second embodiment of this invention.

FIG. 7 is an exploded drawing showing an armature 2 of a rotary electric machine 1 according to a second embodiment of this invention. In the present embodiment, when FIG. 7 is compared with FIG. 4, the base coils 12 are arranged so as to avoid the positions of all of the virtual specific coils 12A of each virtual coil pair 23 in FIG. 4. Furthermore, the coil sides 21 of the upper layer coils 13 and the lower layer coils 14 are arranged at the positions of the respective coil sides 21a of the virtual specific coils 12A, where arrangement of the base coils 12 is avoided. In other words, the coil sides 21 of the upper layer coils 13 are arranged at the positions of the upper openings of the slots 11, among the positions of the coil sides 21a of each of the virtual specific coils 12A, and the coil sides 21 of the lower layer coils 14 are arranged at the positions of the lower openings of the slots 11. The remaining configuration is similar to the first embodiment.

In this way, since the base coils 12 are arranged so as to avoid the positions of all of the virtual specific coils 12A of the virtual coil pairs 23, and the coil sides 21 of the upper layer coils 13 and the lower layer coils 14 are arranged at the positions of the coil sides 21a of the virtual specific coils 12A, then similarly to the first embodiment, the operating characteristics of the rotary electric machine 1 are good, and the manufacture of the rotary electric machine 1 can be facilitated. Furthermore, it is possible to eliminate the work of adjusting the lengths of the conducting wires constituting the upper layer coils 13 and the lower layer coils 14, between each phase, and the rotary electric machine 1 can be manufactured even more easily. In other words, if the upper layer coils 13 and the lower layer coils 14 are not wound at positions corresponding the virtual coil pairs 23 of the U phase and the W phase, and only upper layer coils 13 and lower layer coils 14 corresponding to the virtual coil pair 23 of the V-phase are wound on the armature core 7, as in the first embodiment, for example, then due to the difference between the lengths of the conducting wires in the upper layer coils 13 and the lower layer coils 14, and the lengths of the conducting wires in the base coils 12, the coil resistance varies between the V phase and the U phase and the W phase, and there is a risk that the balance of induced voltages generated in the respective phase will be easily disturbed. In the first embodiment, in order to avoid this, it is necessary to adjust the lengths of the conducting wires of the upper layer coils 13 and the lower layer coils 14, in advance. On the other hand, in the present embodiment, since upper layer coils 13 and lower layer coils 14 of the same number are arranged for each phase, then it is not necessary to adjust the lengths of the conducting wires in each of the upper layer coils 13 and the lower layer coils 14, and the armature 2 can be manufactured even more easily.

Third Embodiment

If the virtual base coils 12a situated between respective virtual specific coils 12A included in the virtual coil pairs 23 in FIG. 4 are called virtual adjustment coils 12B, then in the armature 2 of the first comparative example, as shown in FIG. 4, the current phase in the virtual adjustment coils 12B and the current phase in the virtual coil pair 23 configured by two virtual specific coils 12A having the virtual adjustment coils 12B therebetween will be mutually different. In this example, the current phase of the virtual adjustment coils 12B situated between the virtual specific coils 12A of the V-phase virtual coil pair 23 is the W phase, the current phase of the virtual adjustment coils 12B situated between the virtual specific coils 12A of the U-phase virtual coil pair 23 is the V phase, and the current phase of the virtual adjustment coils 12B situated between the virtual specific coils 12A of the W-phase virtual coil pair 23 is the U phase.

The virtual adjustment coils 12B of the U phase, V phase and W phase are virtual base coils 12a which create induced voltages having a phase differential of 120° therebetween. Furthermore, the virtual adjustment coils 12B of the U phase, the V phase and the W phase are present in equal number (in the example, one each) in the scope of the electrical angle range α°. The electrical angle range α° is determined by the number of slots Q and the number of poles P, in other words, by the number of slots per pole, q', and is expressed by Formula (3) below.

$$\alpha°=180°\times P/\gcd(Q,P)=1260° \tag{3}$$

Here, gcd (Q,P) is the greatest common divisor of the slot number Q and the number of poles P in the rotor 4.

Figure 8:
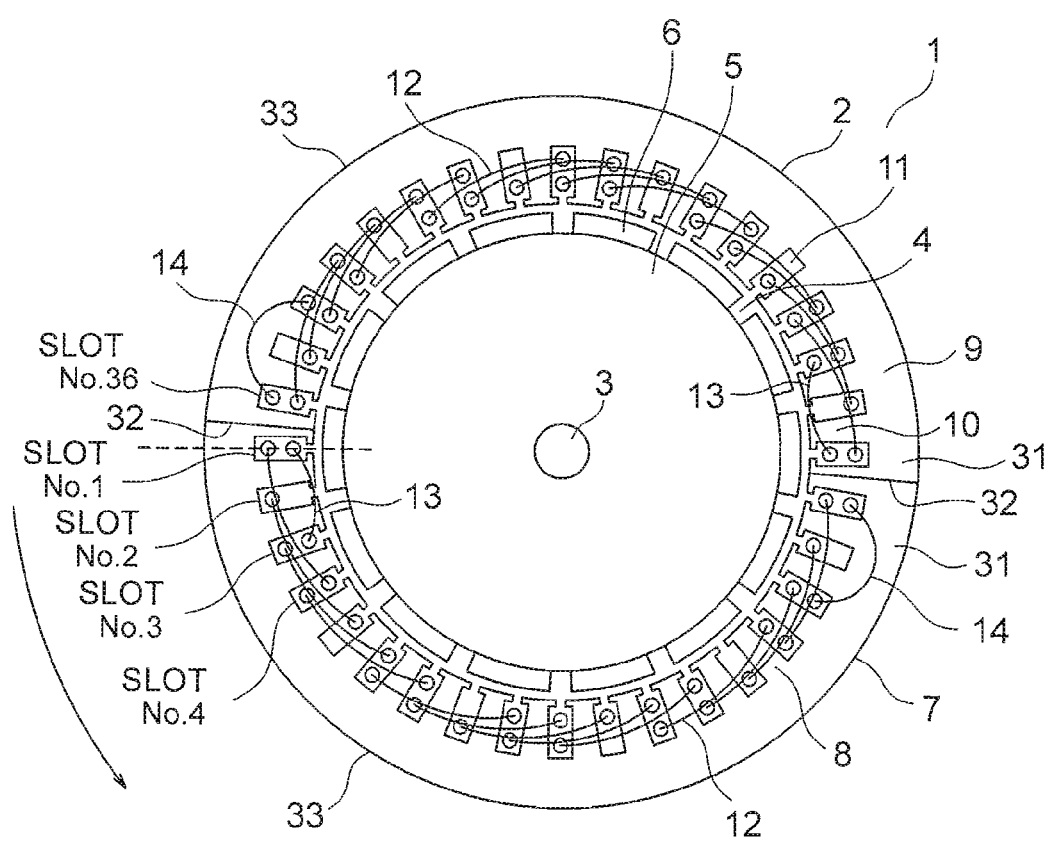
FIG. 8 is a schematic drawing showing a rotary electric machine according to a third embodiment of this invention.
Figure 9:
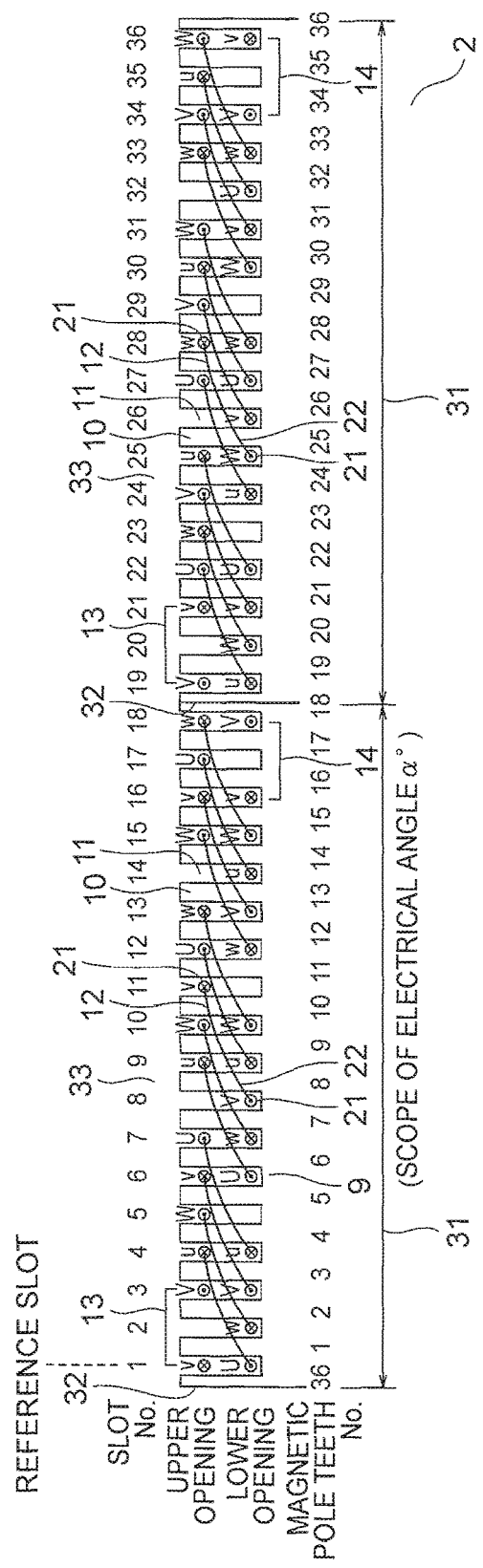
FIG. 9 is an exploded diagram showing the armature in FIG. 8.

FIG. 8 is a schematic drawing showing a rotary electric machine 1 according to a third embodiment of this invention. Furthermore, FIG. 9 is an exploded diagram showing the armature 2 in FIG. 8. In the present embodiment, when FIG. 9 is compared with FIG. 4, the base coils 12 are arranged respectively at the positions of each of the virtual base coils 12a while avoiding the positions of the virtual specific coils 12A of the V-phase virtual coil pair 23, and the positions of the virtual adjustment coils 12B of each phase which are situated in the scope of the electrical angle range α°.

In this example, the coil sides 21 of upper layer coils 13 and lower layer coils 14 are arranged at the positions of the coil sides 21a of the virtual specific coils 12A on either side of the W-phase virtual adjustment coils 12B, of the respective virtual adjustment coils 12B where the arrangement of base coils 12 is avoided within the scope of the electrical angle range α°. In other words, the coil sides 21 of the upper layer coils 13 and the lower layer coils 14 are arranged at the positions of the coil sides 21a of the virtual specific coils 12A of the V-phase virtual coil pair 23, similarly to the first embodiment.

Consequently, the state of the armature 2 is a state where the coil ends 22 of the base coils 12, upper layer coils 13 and lower layer coils 14 do not span the magnetic pole teeth 10 which are situated between the upper layer coils 13 and the lower layer coils 14 (in the present example, the magnetic pole teeth 10 at No. 18 and No. 36).

When FIG. 9 is compared with FIG. 4, the current phase of the virtual adjustment coils 12B having coil sides 21a situated respectively between the coil sides 21 of the upper layer coils 13 and the coil sides 21 of the lower layer coils 14 (in the example, the two virtual base coils 12a having coil sides 21a situated in the upper openings of the No. 2 and No. 20 slots 11) is the W phase. If only the base coils 12 at the positions of the W-phase virtual adjustment coils 12B are eliminated, then the balance will be disturbed between the induced voltages created in the U phase and the V phase, and the induced voltage created in the W phase, and the operating characteristics of the rotary electric machine will decline. Therefore, in order to avoid this, the base coils 12 are arranged so as to also avoid the positions of the V-phase virtual adjustment coils 12B (in this example, the two virtual base coils 12a having coil sides 21a positioned in the upper openings of the No. 8 and No. 26 slots 11) and the U-phase virtual adjustment coils 12B (in this example, the two virtual base coils 12a having coil sides 21a positioned in the upper openings of the No. 14 and No. 32 slots 11) which maintain the balance of induced voltages of the respective phases, with respect to the W-phase virtual adjustment coils 12B.

In FIG. 8 and FIG. 9, there are slots 11 in which a coil side 21 is arranged in only one of the upper opening or the lower opening. In slots 11 of this kind, a filling material for filling the upper opening or the lower opening of the slot 11 (for example, a spacer block or resin molding, etc.) may be provided to prevent movement of the coil side 21.

The armature core 7 is split into a plurality of split cores 31 (in this example, two split cores 31) which are arranged in the circumference direction of the armature core 7. The split cores 31 are mutually connected by welding, or the like. The positions of the boundaries 32 between the split cores 31 are the positions of the magnetic pole teeth 10 which are not spanned by the coil ends 22 (in this example, the magnetic pole teeth 10 at No. 18 and No. 36). Furthermore, in this example, the boundary 32 of the split cores 31 is formed along the diameter direction of the armature core 7. The armature 2 is configured from a plurality of split armatures 33 (in this example, two split armatures 33), which include the base coils 12 that are wound at positions apart from the positions of the virtual adjustment coils 12B, and the upper layer coils 13, lower layer coils 14, and split cores 31. The remaining configuration is similar to the first embodiment.

FIG. 10 is a table showing the winding factor Kd of the rotary electric machine 1 in FIG. 8. It can be seen that the value of the winding factor Kd of the rotary electric machine 1 according to the present embodiment is good both in terms of the fundamental wave component and the high-order components, compared to the winding factor Kd of the rotary electric machine 101 according to the first comparative example.

In the rotary electric machine 1 such as this, since the base coils 12 are arranged so as to avoid the positions of the virtual adjustment coils 12B of each phase which are positioned within the scope of the electrical angle range α°, and the positions of the virtual specific coils 12A situated on either side of the W-phase virtual adjustment coils 12B, and since the coil sides 21 of the upper layer coils 13 and the lower layer coils 14 are arranged at the positions of the coil sides 21a of the virtual specific coils 12A situated on either side of the W-phase virtual adjustment coils 12B, where the arrangement of the base coils 12 is avoided within the scope of the electrical angle range α°, then it is possible to avoid spanning of the magnetic pole teeth 10 positioned between the upper layer coils 13 and the lower layer coils 14, by the coil ends 22 of the coils 12, 13, 14. Consequently, it is possible to split the armature core 7 into a plurality of split cores 31, at the positions of the magnetic pole teeth 10 situated between the upper layer coils 13 and the lower layer coils 14. Therefore, it is possible to wind the base coils 12, upper layer coils 13 and lower layer coils 14 individually in each split core 31, and the manufacture of the armature 2 can be facilitated. Furthermore, since the balance of the induced voltages of each phase is maintained, then it is possible to maintain good operating characteristics of the rotary electric machine 1, even if base coils 12 are eliminated in order to split the armature core 7. Moreover, since it is possible to reduce the size and weight of the components configuring the armature 2, then even after completion of the rotary electric machine 1, the armature 2 can be disassembled and reassembled in units of the split armature 33, and hence the workability of repair and maintenance, etc. of the rotary electric machine 1 can be improved. Therefore, even if the armature 2 is damaged, it is not necessary to repair or replace the whole armature 2, and hence the costs and work time required to repair and/or replace the rotary electric machine 1 can be reduced.

Fourth Embodiment

Figure 11:
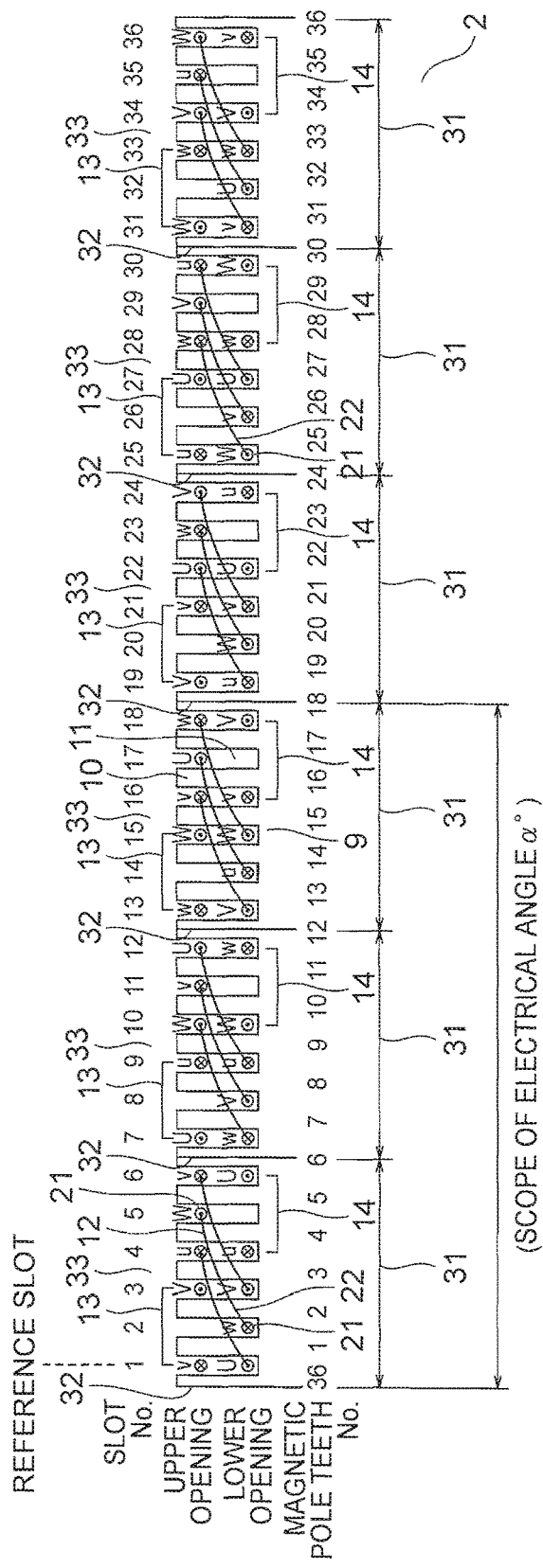
FIG. 11 is an exploded diagram showing the armature of a rotary electric machine according to a fourth embodiment of this invention.

FIG. 11 is an exploded drawing showing an armature 2 of a rotary electric machine according to a fourth embodiment of this invention. When FIG. 11 is compared with FIG. 4, the base coils 12 are arranged so as to avoid the positions of all of the virtual specific coils 12A of the virtual coil pairs 23 in FIG. 4. Furthermore, the base coils 12 are also arranged so as to avoid all of the positions of the virtual base coils (virtual adjustment coils) 12B which are situated between the respective virtual specific coils 12A included in the virtual coil pairs 23. Consequently, the base coils 12 are arranged at the positions of each of the virtual base coils 12a, apart from the positions of all of the virtual specific coils 12A of the virtual coil pairs 23, and the positions of all of the virtual base coils (virtual adjustment coils) 12B situated between the virtual specific coils 12A of the virtual coil pairs 23.

The coil sides 21 of the upper layer coils 13 and the lower layer coils 14 are arranged at the positions of the respective coil sides 21a of all of the virtual specific coils 12A, where the arrangement of the base coils 12 is avoided. In other words, the coil sides 21 of the upper layer coils 13 are arranged at the positions of the upper openings of the slots 11, among the positions of the coil sides 21a of each of the virtual specific coils 12A, and the coil sides 21 of the lower layer coils 14 are arranged at the positions of the lower openings of the slots 11. None of the coil ends 22 of the base coils 12, upper layer coils 13 and lower layer coils 14 span across the magnetic pole teeth 10 situated between an upper layer coil 13 and a lower layer coil 14 which correspond to the same virtual coil pair 23.

In FIG. 11, there are slots 11 in which a coil side 21 is arranged in only one of the upper opening or the lower opening. In slots 11 of this kind, a filling material for filling the upper opening or the lower opening of the slot 11 (for example, a spacer block or resin molding, etc.) may be provided to prevent movement of the coil side 21.

The armature core 7 is split into a plurality of split cores 31 (in this example, six split cores 31) which are arranged in the circumference direction of the armature core 7. The split cores 31 are mutually connected by welding, or the like. The positions of the boundaries 32 between the split cores 31 are the positions of the magnetic pole teeth 10 which are not spanned by the coil ends 22 (in this example, the magnetic pole teeth 10 at No. 6, No. 12, No. 18, No. 24, No. 30 and No. 36). Furthermore, in this example, the boundaries 32 of the split cores 31 are formed along the diameter direction of the armature core 7. The armature 2 is configured from a plurality of split armatures 33 (in this example, six split armatures 33), which include the base coils 12 that are wound at positions apart from the positions of the virtual adjustment coils 12B, and the upper layer coils 13, lower layer coils 14, and split cores 31. The remaining configuration is similar to the second embodiment.

In the rotary electric machine 1 of this kind, since the coil ends 22 do not span across the magnetic pole teeth 10 situated between the upper layer coil 13 and the lower layer coil 14 corresponding to any of the virtual coil pairs 23, and the boundaries 32 of the split cores 31 are formed at the positions of the magnetic pole teeth 10 which are not spanned by any of the coil ends 22, then it is possible to split the armature 2 into a plurality of split armatures 33, and it is possible to manufacture the armature 2 separately as the respective split armatures 33. Therefore, similarly to the third embodiment, it is possible to facilitate the manufacture of the armature 2, improve the workability of repair and maintenance, etc. of the rotary electric machine 1, and reduce the costs and work time involved in repair and replacement of the rotary electric machine 1. Furthermore, it is possible to achieve even greater reduction in the size and weight of the components constituting the armature 2, compared to the third embodiment, and therefore the components constituting the armature 2 can be handled even more easily.

Fifth Embodiment

Figure 12:
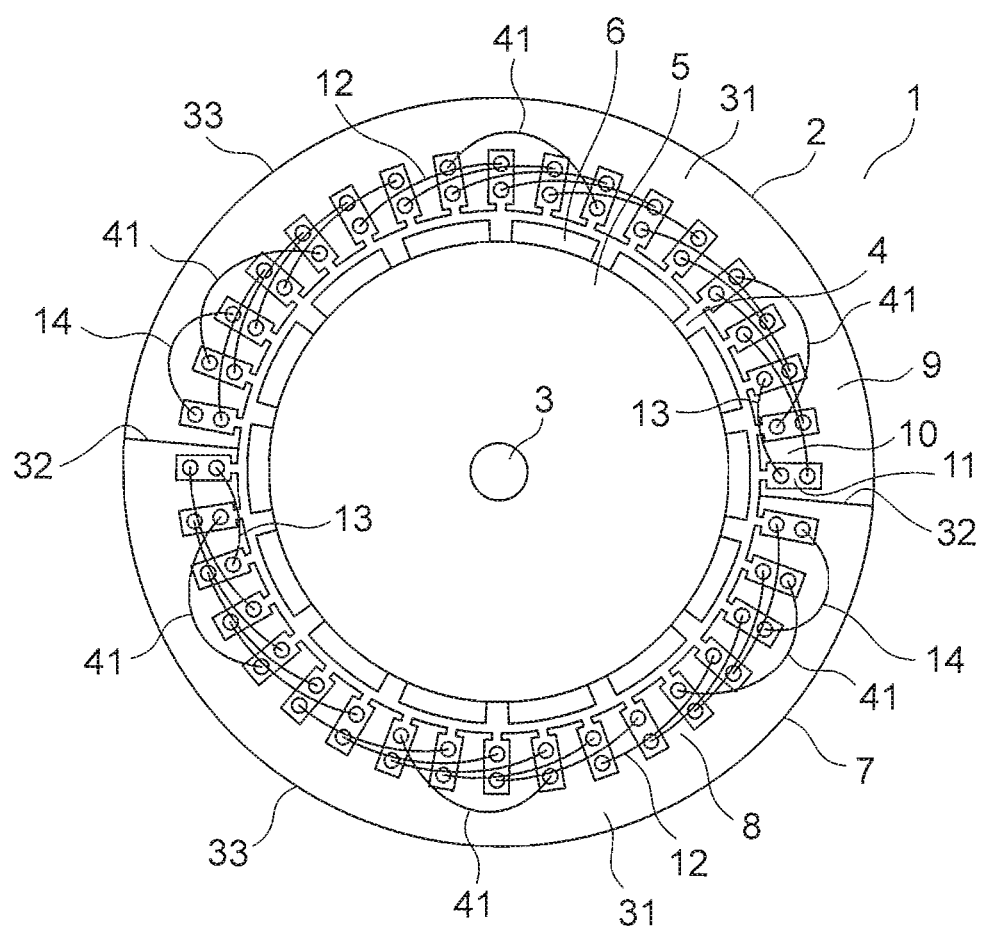
FIG. 12 is a schematic drawing showing a rotary electric machine according to a fifth embodiment of this invention.
Figure 13:
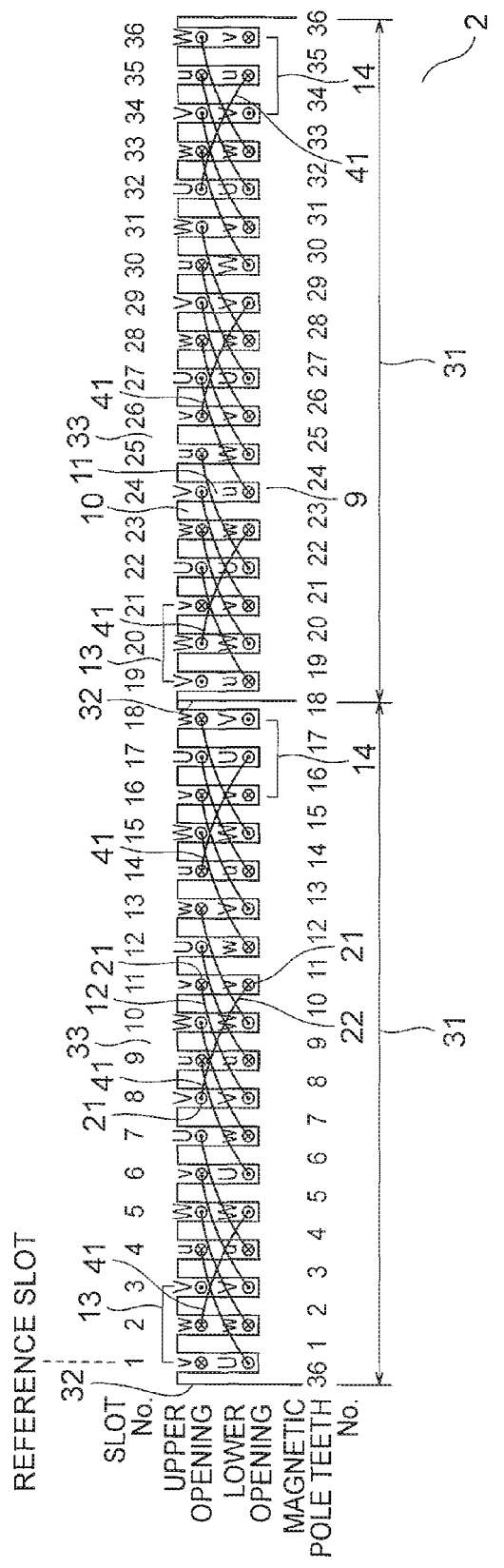
FIG. 13 is an exploded diagram showing the armature in FIG. 12.

FIG. 12 is a schematic drawing showing a rotary electric machine 1 according to a fifth embodiment of this invention. Furthermore, FIG. 13 is an exploded diagram showing the armature 2 in FIG. 12. The armature coil group 8 further includes, as armature coils, a plurality of additional coils 41 which respectively create induced voltages that increase the size of the combined vectors of the induced voltages created by the base coils 12, upper layer coils 13 and lower layer coils 14, for each phase (U phase, V phase, W phase). In the armature coil group 8 according to the present embodiment, a three-phase current flows in the base coils 12, the upper layer coils 13, the lower layer coils 14 and the additional coils 41. In this example, moreover, two of the additional coils 41 are provided in the armature core 7 for each of the U phase, the V phase and the W phase.

When FIG. 13 is compared with FIG. 4, the base coils 12 are arranged at the positions of each of the virtual base coils 12a, while avoiding the positions of the virtual specific coils 12A included in the V-phase virtual coil pair 23, and the virtual adjustment coils 12B corresponding to each of the virtual coil pairs 23 (the virtual base coils 12a situated between the virtual specific coils 12A of each virtual coil pair 23). Furthermore, the coil sides 21 of the upper layer coils 13 and the lower layer coils 14 are arranged at the positions of the respective coil sides 21a of all of the virtual specific coils 12A included in the V-phase virtual coil pair 23.

The armature core 7 is split into a plurality of split cores 31 (in this example, two split cores 31) which are arranged in the circumference direction of the armature core 7. The split cores 31 are mutually connected by welding, or the like. The positions of the boundaries 32 between the split cores 31 are the positions of the magnetic pole teeth 10 which are not spanned by the coil ends 22 (in this example, the magnetic pole teeth 10 at No. 18 and No. 36). Furthermore, in this example, the boundaries 32 of the split cores 31 are formed along the diameter direction of the armature core 7. The armature 2 is configured from a plurality of split armatures 33 (in this example, two split armatures 33), which include the base coils 12, upper layer coils 13, lower layer coils 14, additional coils 41 and split cores 31. In other words, the arrangement of the base coils 12, upper layer coils 13 and lower layer coils 14 and the configuration of the armature core 7 is similar to that in FIG. 9.

The additional coils 41 are overlap-wound coils which include a pair of coil sides 21 arranged in mutually different slots 11, and a pair of coil ends 22 that connect together the pair of coil sides 21. The coil sides 21 of the base coils 12, upper layer coils 13 and lower layer coils 14 are not arranged in all of the upper openings and lower openings of the slots 11, and the coil sides 21 of the additional coils 41 are arranged in the empty positions (in the example, the upper openings of the No. 2, No. 8, No. 14, No. 20, No. 26 and No. 32 slots 11, and the lower openings of the No. 5, No. 11, No. 17, No. 23, No. 29 and No. 35 slots 11). In other words, the coil sides 21 of the additional coils 41 are arranged at the positions of the respective coil sides 21a of the virtual adjustment coils 12B.

The coil ends 22 of the additional coils 41 are arranged in an inclined fashion in the reverse direction to the coil ends 22 of the base coils 12, with respect to the circumference direction of the armature core 7. Furthermore, the additional coils 41 are arranged so as to avoid the magnetic pole teeth 10 which are not spanned by any of the base coils 12, upper layer coils 13 and lower layer coils 14 (in this example, the magnetic pole teeth 10 at No. 18 and No. 36). Moreover, the number of magnetic pole teeth 10 spanned by the coil ends 22 of the additional coils 41 is the same in each of the additional coils 41. In other words, the coil pitch of each additional coil 41 is the same. In this example, the number of magnetic pole teeth 10 spanned by the coil ends 22 of the additional coils 41 is three.

When FIG. 13 is compared with FIG. 4, the additional coils 41 are arranged between one virtual coil pair 23 and another virtual coil pair 23, in a state where one virtual coil pair 23 and another virtual coil pair 23 which are created in mutually adjacent positions are in a partially overlapped state. The current phase of the additional coil 41 arranged between one virtual coil pair 23 and another virtual coil pair 23 is different to the current phases of the two virtual coil pairs 23. For example, the current phase of the additional coil 41 which has coil sides 21 arranged respectively in the No. 2 and No. 5 slots 11 is the W phase, since the additional coil 41 is arranged between a V-phase virtual coil pair 23 (the virtual coil pair 23 including coil sides 21a arranged in the upper openings of the No. 1 and No. 3 slots 11) and a U-phase virtual coil pair 23 (the virtual coil pair 23 including coil sides 21a arranged in the lower openings of the No. 4 and No. 6 slots 11).

Furthermore, the direction of the current of the coil sides 21 in the additional coils 41 is the same as the current flowing in the coil sides 21 arranged in the same slot 11 as the coil sides 21 of the additional coil 41, among the coil sides 21 of the base coils 12 having the same phase as the additional coils 41. The remaining configuration is similar to the third embodiment.

Figures 14, 15:
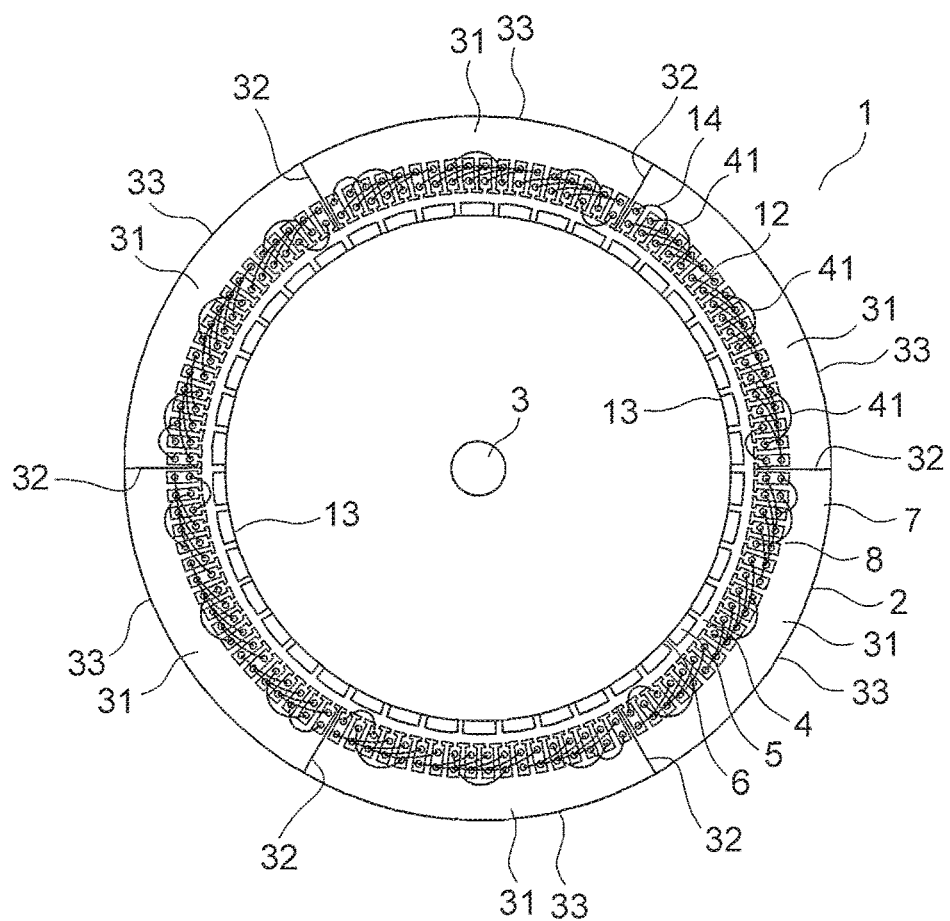
FIG. 14 is a table showing the winding factor Kd of the rotary electric machine in FIG. 12.
FIG. 15 is a schematic drawing showing a rotary electric machine according to a sixth embodiment of this invention.

FIG. 14 is a table showing the winding factor Kd of the rotary electric machine 1 in FIG. 12. It can be seen that the value of the winding factor Kd of the rotary electric machine 1 according to the present embodiment is good both in terms of the fundamental wave component and the high-order components, compared to the winding factor Kd of the rotary electric machine 101 according to the first comparative example.

In the rotary electric machine 1 of this kind, since the armature coil group 8 includes, as armature coils, the plurality of additional coils 41 which respectively create induced voltages that increase the size of the combined vectors of the induced voltages created by the base coils 12, upper layer coils 13 and lower layer coils 14, in each phase, and since the coil sides 21 of the additional coils 41 are arranged at the positions of the coil sides 21a of the virtual adjustment coils 12B, then it is possible to increase the number of coils compared to the third embodiment, and the torque generated by the rotary electric machine 1 can be increased. Furthermore, since the additional coils 41 are arranged so as to avoid the magnetic pole teeth 10 that are not spanned by coil ends 22, then it is possible to split the armature 2 into a plurality of split armatures 33.

Consequently, similarly to the third and fourth embodiments, it is possible to facilitate the manufacture of the armature 2, and furthermore, the costs and work time involved in repairing and replacing the rotary electric machine 1, etc. can be reduced.

Sixth Embodiment

FIG. 15 is a schematic drawing showing a rotary electric machine 1 according to a sixth embodiment of this invention. In the present embodiment, the number of slots Q is 108 and the number of magnetic poles P of the rotor 4 is 42. The number of slots per pole q' is 18/7. In other words, in the rotary electric machine 1 according to the present embodiment, although the number of slots Q and the number of magnetic poles P is greater than in the rotary electric machine 1 of the first to fifth embodiments, the value of the number of slots per pole q' is the same as the first to fifth embodiments. Therefore, the configuration of the armature 2 in the present embodiment is one based on continuous arrangement of sets each comprising eighteen slots 11 and seven magnetic poles of the rotor 4, similarly to the armature 2 according to the first to fifth embodiments. In the present embodiment, the armature 2 is configured from six split armatures 33 which are connected in the circumference direction of the armature 2. The configuration of each split armature 33 is the same as the configuration of the split armatures 33 in the fifth embodiment.

In this way, even if the number of split armatures 33 having the same configuration as the fifth embodiment is six, it is still possible to obtain similar beneficial effects to the fifth embodiment. In a similar fashion, in the first to fourth embodiments also, provided that the value of the number of slots per pole q' is the same, then it is possible to arrange the coils in a similar manner regardless of increase or decrease in the number of slots Q and the number of poles P, and similar beneficial effects can be achieved.

Seventh Embodiment

Before describing the rotary electric machine 1 according to the seventh embodiment, the configuration of the rotary electric machine 101 according to a second comparative example will be described.

Figure 16:
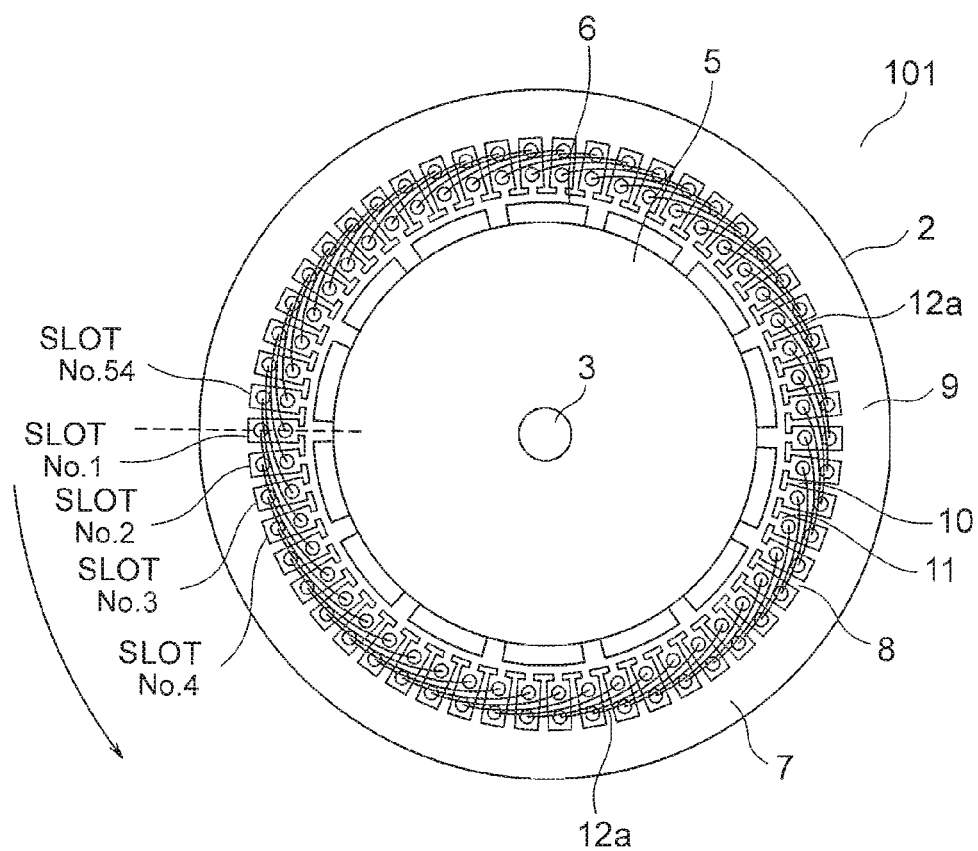
FIG. 16 is a schematic drawing showing a rotary electric machine according to a second comparative example.
Figure 17:
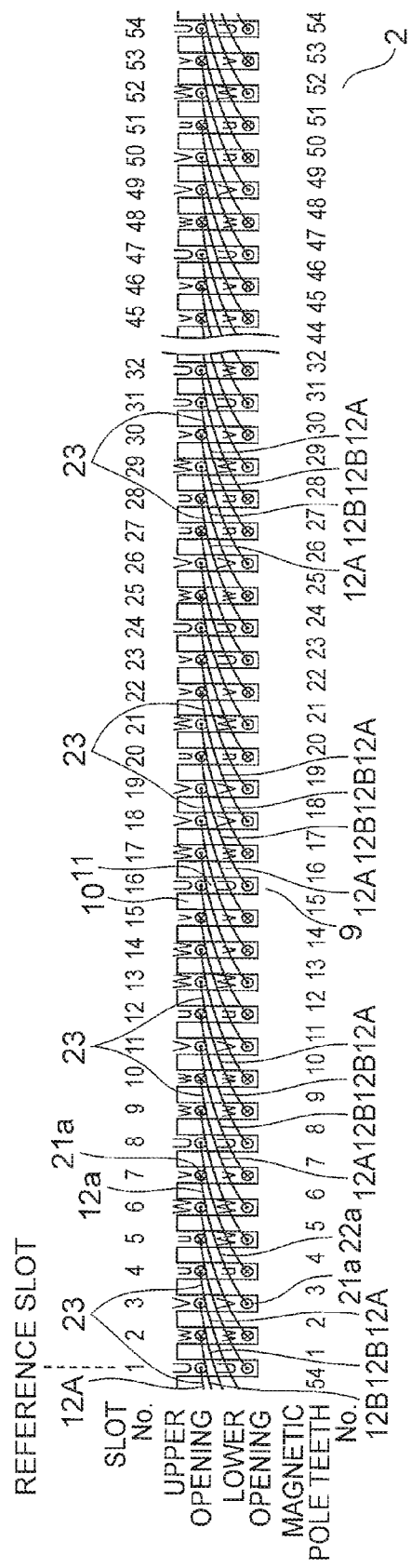
FIG. 17 is an exploded diagram showing the armature in FIG. 16.

FIG. 16 is a schematic drawing showing a rotary electric machine 101 according to a second comparative example. Furthermore, FIG. 17 is an exploded diagram showing the armature 2 in FIG. 16. In the rotary electric machine 101 according to the second comparative example, similarly to the first comparative example, the virtual base coils 12a are wound in a two-layer overlap winding configuration and arranged in regular fashion in the armature core 7.

Furthermore, in the rotary electric machine 101 according to the second comparative example, the number Q of slots 11 is 54 and the number of magnetic poles P in the rotor 4 is 14. Therefore, the value of the number of slots per pole q' in the second comparative example is 27/7 (=3.85), which is a value greater than 3 and less than 4 (3<q'<4). Therefore, from Formula (2), it can be seen that the configuration of the armature 2 of the rotary electric machine 101 according to the second comparative example is a configuration of an armature 2 where N=3. Consequently, in the second comparative example, it can be seen that the coil pitch of each virtual base coil 12a is four.

Looking at the U phase, it can be seen that a set of coil sides 21a in which currents of the same phase are flowing in opposite directions are arranged respectively in the upper openings of the No. 1 and No. 4 slots 11, the lower openings of the No. 24 and No. 27 slots 11, the upper openings of the No. 28 and No. 31 slots 11, and the lower openings of the No. 51 and No. 54 slots 11. Furthermore, it can be seen that the distance between the No. 1 and No. 4 slots 11 and the No. 28 and No. 31 slots 11, in whose upper openings the sets of coil sides 21a passing currents of the same phase and opposite direction are situated, is equivalent to 27 slots, and the distance between the No. 24 and No. 27 slots 11 and the No. 51 and No. 54 slots 11, in whose lower openings the sets of coil sides 21a passing currents of the same phase and opposite direction are situated, is also equivalent to 27 slots.

Moreover, it can be seen that the coil sides 21a respectively in the upper openings of the No. 1 and No. 4 slots 11, and in the lower openings of the No. 51 and No. 54 slots 11 are coil sides 21a of the same two virtual base coils 12a, and the coil sides 21a respectively in the upper openings of the No. 28 and No. 31 slots 11 and the lower openings of the No. 24 and No. 27 slots 11 are coil sides 21a of the same two virtual base coils 12a. For this reason, in FIG. 17, two virtual base coils 12a which have a relationship whereby currents of the same phase and opposite directions are flowing in the two coil sides 21a in the upper openings (or lower openings) of two slots 11 having three (N=3) magnetic pole teeth 10 therebetween are respectively called virtual specific coils 12A, and a virtual coil pair 23 configured by two virtual specific coils 12A is arranged at an interval of 27 slots apart. Furthermore, in the case of the V phase and the W phase, similarly to the U phase, a virtual coil pair 23 is arranged at an interval of 27 slots apart.

The sequence of the current phase in each of the virtual coil pairs 23 which are present at uniform slot intervals apart repeats the phases (U phase, V phase, W phase) in the same order. In the virtual base coil 12a in FIG. 17, taking the coil side 21a in the upper opening of the slot 11 as a reference, the virtual coil pair 23 having two coil sides 21a in the upper openings of No. 1 and No. 4 is in the U phase, the virtual coil pair 23 having two coil sides 21a in the upper openings of No. 10 and No. 13 is in the W phase, and the virtual coil pair 23 having two coil sides 21a in the upper openings of No. 19 and No. 22 is in the V phase, and hence the phases are repeated in the sequence, U phase, W phase and V phase. The remainder of the configuration of the second comparative example is similar to the first comparative example.

FIG. 18 is a table showing the winding factor Kd of the rotary electric machine 101 according to the second comparative example. In the rotary electric machine 101 according to the second comparative example, it can be seen that the value of the winding factor Kd tends to be good in terms of both the fundamental wave component and the high-order components.

Figure 19:
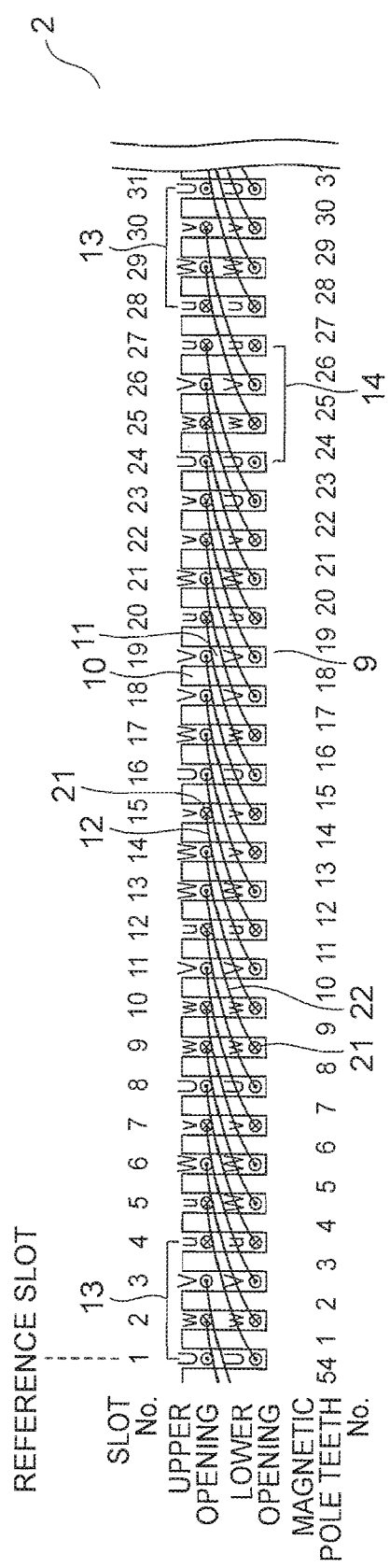
FIG. 19 is an exploded diagram showing the armature of a rotary electric machine according to a seventh embodiment of this invention.

FIG. 19 is an exploded drawing showing an armature 2 of a rotary electric machine 1 according to a seventh embodiment of this invention. When FIG. 19 is compared with FIG. 17, the base coils 12 are arranged at the positions of each of the virtual base coils 12a, so as to avoid the positions of all of the virtual specific coils 12A included in the U-phase virtual coil pairs 23. The coil sides 21 of the upper layer coils 13 and the lower layer coils 14 are arranged at the positions of the respective coil sides 21a of all of the U-phase virtual specific coils 12A, where the arrangement of the base coils 12 is avoided. Furthermore, the coil ends 22 of the upper layer coils 13 and the lower layer coils 14 span three (N=3) magnetic pole teeth 10. In other words, the coil pitches of the upper layer coils 13 and the lower layer coils 14 are both N=3.

In other words, the armature 2 according to the present embodiment is configured such that, supposing a virtual base coil installation state (FIG. 17) in which all of the coil sides 21a of the virtual base coils 12a are arranged regularly in all of the upper openings and lower openings of the slots 11, then the base coils 12 are disposed in all of the positions of the virtual base coils 12a, apart from the positions of the virtual specific coils 12A which are included in the U-phase virtual coil pair 23, and the coil sides 21 of upper layer coils 13 and lower layer coils 14 are arranged at the positions of the coil sides 21a of the virtual specific coils 12A, where the base coils 12 are not arranged. The remaining configuration is similar to the first embodiment.

In this way, even if the number of slots per pole q' is greater than 3 and smaller than 4, it is still possible to make the coil pitch of each of the upper layer coils 13 and the lower layer coils 14 (N=3) smaller than the coil pitch of each of the base coils 12 (N+1=4), while maintaining good operating characteristics of the rotary electric machine 1. Consequently, it is possible to reduce the amount of work involved in a coil raising task for bending a portion of the base coils 12 to remove the coil sides 21 from the slots 11, when winding the base coils 12 onto the armature core 7, and therefore the manufacture of the rotary electric machine 1 can be facilitated.

Eighth Embodiment

If the virtual base coils 12a which are situated between the virtual specific coils 12A included in the virtual coil pairs 23 according to the second comparative example are called virtual adjustment coils 12B, then in FIG. 17, the current phases of the two virtual adjustment coils 12B situated between the virtual specific coils 12A of the U-phase virtual coil pair 23 are the V phase and W phase, the current phases of the two virtual adjustment coils 12B situated between the virtual specific coils 12A of the W-phase virtual coil pair 23 are the V phase and U phase, and the current phases of the two virtual adjustment coils 12B situated between the virtual specific coils 12A of the V-phase virtual coil pair 23 are the U phase and W phase.

The virtual adjustment coils 12B of the U phase, V phase and W phase are virtual base coils 12a which create induced voltages having a phase differential of 120° therebetween. Furthermore, the virtual adjustment coils 12B of the U phase, the V phase and the W phase are present in equal number (in the example, two each) in the scope of the electrical angle range $\alpha°$ expressed by Formula (3) ($\alpha°$=1260°).

Figure 20:
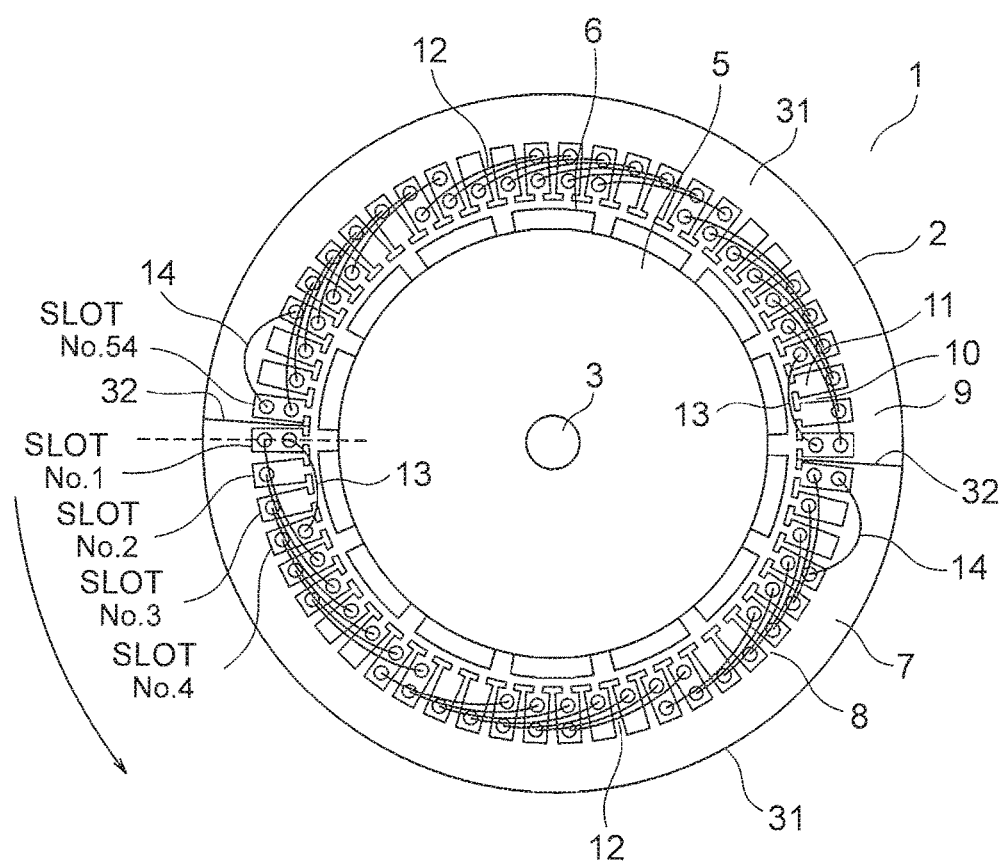
FIG. 20 is a schematic drawing showing a rotary electric machine according to an eighth embodiment of this invention.
Figure 21:
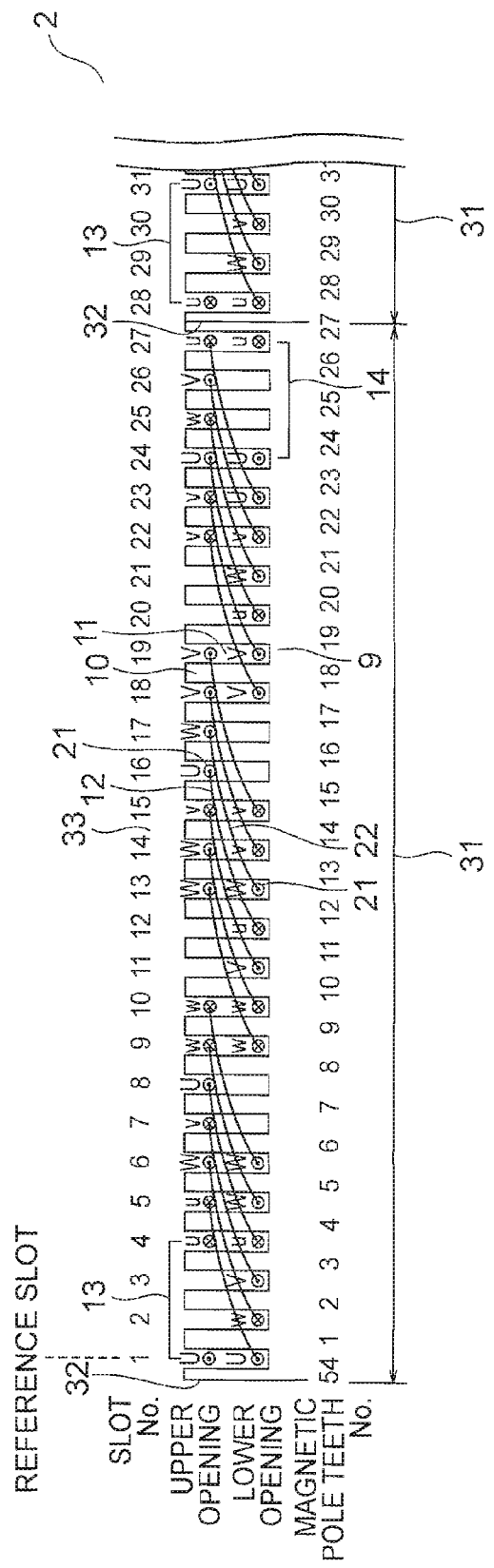
FIG. 21 is an exploded diagram showing the armature in FIG. 20.

FIG. 20 is a schematic drawing showing a rotary electric machine 1 according to an eighth embodiment of this invention. Furthermore, FIG. 21 is an exploded diagram showing the armature 2 in FIG. 20. In the present embodiment, when FIG. 21 is compared with FIG. 17, the base coils 12 are arranged respectively at the positions of each of the virtual base coils 12a, avoiding the positions of the virtual specific coils 12A of the U-phase virtual coil pair 23, and the positions of the virtual adjustment coils 12B of each phase which are situated in the scope of the electrical angle range $\alpha°$ ($\alpha°$=1260°).

The coil sides 21 of upper layer coils 13 and lower layer coils 14 are arranged at the positions of the coil sides 21a of the U-phase virtual specific coils 12A on either side of the two W-phase and V-phase virtual adjustment coils 12B, of the respective virtual adjustment coils 12B where the arrangement of base coils 12 is avoided within the scope of the electrical angle range $\alpha°$. In other words, the coil sides 21 of the upper layer coils 13 and the lower layer coils 14 are arranged at the positions of the coil sides 21a of the virtual specific coils 12A of the U-phase virtual coil pair 23, similarly to the seventh embodiment.

Consequently, the state of the armature 2 is a state where the coil ends 22 of the base coils 12, upper layer coils 13 and lower layer coils 14 do not span across the magnetic pole teeth 10 which are situated between the upper layer coils 13 and the lower layer coils 14 (in the present example, the magnetic pole teeth 10 at No. 27 and No. 54).

When FIG. 21 is compared with FIG. 17, the current phases of the two virtual adjustment coils 12B having the coil sides 21a which are respectively situated between the coil sides 21 of upper layer coils 13 and between the coil sides 21 of lower layer coils 14, are the W phase and the V phase. When the base coils 12 are only eliminated at the positions of the virtual adjustment coils 12B of the W phase and the V phase, then the balance of the induced voltage in the whole of the armature coil group 8 is disrupted, and the operating characteristics of the rotary electric machine decline. Therefore, in order to avoid this, in this example, the base coils 12 are arranged so as to avoid the respective positions of the V-phase and U-phase virtual adjustment coils 12B and the U-phase and W-phase virtual adjustment coils 12B which maintain the balance of the induced voltages of each phase in relation to the virtual adjustment coils 12B of the W phase and V phase.

In FIG. 20 and FIG. 21, there are slots 11 in which a coil side 21 is arranged in only one of the upper opening or the lower opening. In slots 11 of this kind, a filling material for filling the upper opening or the lower opening of the slot 11 (for example, a spacer block or resin molding, etc.) may be provided to prevent movement of the coil side 21.

The armature core 7 is split into a plurality of split cores 31 (in this example, two split cores 31) which are arranged in the circumference direction of the armature core 7. The split cores 31 are mutually connected by welding, or the like. The positions of the boundaries 32 between the split cores 31 are the positions of the magnetic pole teeth 10 which are not spanned by the coil ends 22 (in this example, the magnetic pole teeth 10 at No. 27 and No. 54). Furthermore, in this example, the boundaries 32 of the split cores 31 are formed along the diameter direction of the armature core 7. The armature 2 is configured from a plurality of split armatures 33 (in this example, two split armatures 33), which include the base coils 12 that are wound at positions apart from the positions of the virtual adjustment coils 12B, and the upper layer coils 13, lower layer coils 14, and split cores 31. The remaining configuration is similar to the seventh embodiment.

Figures 22, 23:
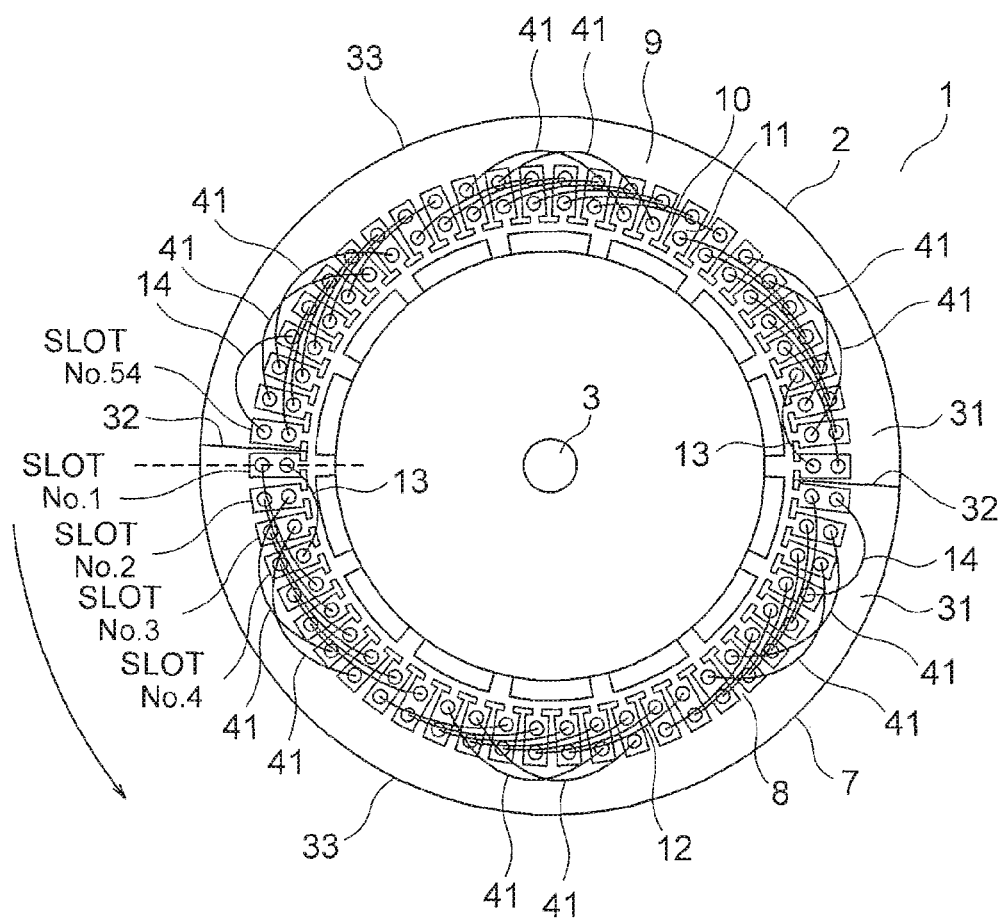
FIG. 22 is a table showing the winding factor Kd of the rotary electric machine in FIG. 20.
FIG. 23 is a schematic drawing showing a rotary electric machine according to a ninth embodiment of this invention.

FIG. 22 is a table showing the winding factor Kd of the rotary electric machine 1 in FIG. 20. It can be seen that the value of the winding factor Kd of the rotary electric machine 1 according to the present embodiment is good both in terms of the fundamental wave component and the high-order components, compared to the winding factor Kd of the rotary electric machine 101 according to the second comparative example (FIG. 18).

In this way, even if the number of slots per pole q' is greater than 3 and smaller than 4, it is still possible to split the armature core 7 into a plurality of split cores 31, similarly to the third embodiment. Consequently, it is possible to facilitate the manufacture of the armature 2, and furthermore, the costs and work time involved in repairing and replacing the rotary electric machine 1, etc. can be reduced. Furthermore, since the balance of the induced voltages of each phase is maintained, then the operating characteristics of the rotary electric machine 1 are good, even if base coils 12 are eliminated in order to split the armature core 7.

Ninth Embodiment

Figure 24:
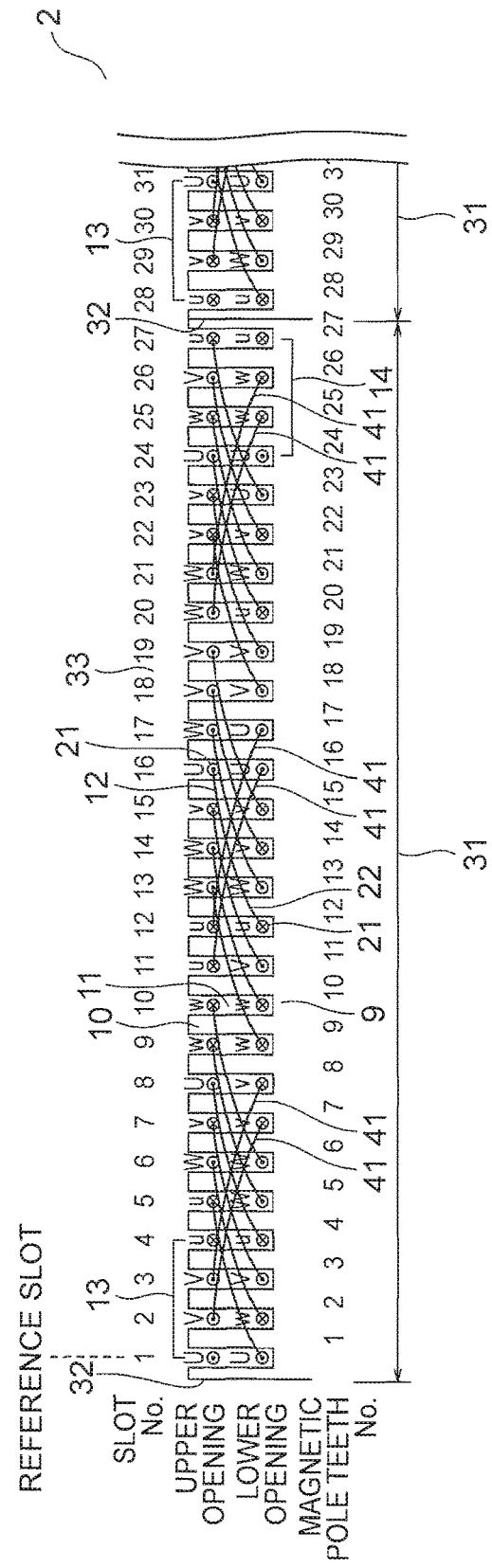
FIG. 24 is an exploded diagram showing the armature in FIG. 23.

FIG. 23 is a schematic drawing showing a rotary electric machine 1 according to a ninth embodiment of this invention. Furthermore, FIG. 24 is an exploded diagram showing the armature 2 in FIG. 23. Similarly to the fifth embodiment, the armature coil group 8 further includes, as armature coils, a plurality of additional coils 41 which respectively create induced voltages that increase the size of the combined vectors of the induced voltages created by the base coils 12, upper layer coils 13 and lower layer coils 14, for each phase (U phase, V phase, W phase). In this example, four of the additional coils 41 are provided in the armature core 7 for each of the U phase, the V phase and the W phase. In other words, the arrangement of the base coils 12, upper layer coils 13 and lower layer coils 14 and the configuration of the armature core 7 is similar to that in FIG. 20 and FIG. 21.

Similarly to the fifth embodiment, the additional coils 41 are overlap-wound coils which include a pair of coil sides 21 arranged in mutually different slots 11, and a pair of coil ends 22 that connect together the pair of coil sides 21. The coil sides 21 of the base coils 12, upper layer coils 13 and lower layer coils 14 are not arranged in all of the upper openings and lower openings of the slots 11, and the coil sides 21 of the additional coils 41 are arranged in the empty positions. In other words, the coil sides 21 of the additional coils 41 are arranged at the positions of the respective coil sides 21*a* of the virtual adjustment coils 12B.

Similarly to the fifth embodiment, the coil ends 22 of the additional coils 41 are arranged in an inclined fashion in the reverse direction to the coil ends 22 of the base coils 12, with respect to the circumference direction of the armature core 7. Furthermore, the additional coils 41 are arranged so as to avoid the magnetic pole teeth 10 which are not spanned by any of the base coils 12, upper layer coils 13 and lower layer coils 14 (in this example, the magnetic pole teeth 10 at No. 27 and No. 54). Moreover, the number of magnetic pole teeth 10 spanned by the coil ends 22 of the additional coils 41 is the same in each of the additional coils 41. In other words, the coil pitch of each additional coil 41 is the same. In this example, the number of magnetic pole teeth 10 spanned by the coil ends 22 of the additional coils 41 is five.

When FIG. 24 is compared with FIG. 17, the additional coils 41 are arranged, two each, between one virtual coil pair 23 and another virtual coil pair 23, in a state where one virtual coil pair 23 and another virtual coil pair 23 which are created in mutually adjacent positions are in a partially overlapped state. In the coil sides 21 of the additional coils 41 arranged between one virtual coil pair 23 and the other virtual coil pair 23, currents of the same phase flow in opposite directions in either the coil sides 21 arranged in the same slots 11 as the coil sides 21 of the additional coils 41, or the coil sides 21 arranged in the adjacent slots 11.

In this example, the current phase of the additional coil 41 arranged between one virtual coil pair 23 and another virtual coil pair 23 is different to the current phases of the two virtual coil pairs 23. Furthermore, in this example, the current phases of the two additional coils 41 which are mutually aligned are the same. For example, the current phase of the two additional coils 41 which are arranged between the U-phase virtual coil pair 23 (the virtual coil pair 23 including coil sides 21*a* arranged in the upper openings of the No. 1 and No. 4 slots 11) and the W-phase virtual coil pair 23 (the virtual coil pair 23 including coil sides 21*a* arranged in the lower openings of the No. 6 and No. 9 slots 11) (in other words, the two additional coils 41 having coil sides 21 arranged respectively in the No. 2 and 3 and No. 7 and 8 slots 11) is the V phase. Furthermore, the direction of the current of the coil sides 21 in the additional coils 41 is the same as the current flowing in the coil sides 21 arranged in the same slot 11 as the coil sides 21 of the additional coil 41, among the coil sides 21 of the base coils 12 having the same phase as the additional coils 41. The remaining configuration is similar to the eighth embodiment.

FIG. 25 is a table showing the winding factor Kd of the rotary electric machine 1 in FIG. 23. It can be seen that the value of the winding factor Kd of the rotary electric machine 1 according to the present embodiment is good both in terms of the fundamental wave component and the high-order components, compared to the winding factor Kd of the rotary electric machine 101 according to the second comparative example (FIG. 18).

In this way, even if the number of slots per pole q' is greater than three and less than four, it is still possible to increase the number of coils in comparison with the eighth embodiment, and the torque generated by the rotary electric machine 1 can be increased. Furthermore, similarly to the eighth embodiment, it is possible to split the armature core 7 into a plurality of split cores 31 and to facilitate the manufacture of the armature 2, and furthermore, the costs and work time involved in repairing and replacing the rotary electric machine 1, etc. can be reduced.

In other words, as indicated in the seventh to ninth embodiments, regardless of the combination of the number of slots Q in the armature 2 of the rotary electric machine 1 and the number of magnetic poles P in the rotor 4, provided that the number of slots per pole q' satisfies Formula (2), it is possible to obtain upper layer coils 13 and lower layer coils 14 having a coil pitch N that is smaller than the coil pitch N+1 of the base coils 12, while maintaining the arrangement of the coil sides 21. Consequently, it is possible to obtain a beneficial effect in that the manufacture of the rotary electric machine 1 can be facilitated, while maintaining good operating characteristics of the rotary electric machine 1.

In the first, second and fourth to ninth embodiments, only the V-phase or U-phase virtual coil pairs 23 are taken as the object, and the base coils 12 are arranged by avoiding only the positions of all of the virtual specific coils 12A which constitute the object V-phase or U-phase virtual coil pairs 23, but it is sufficient to set at least one of the virtual coil pairs 23 as the object and to arrange the base coils 12 so as to avoid the positions of all of the virtual specific coils 12A constituting the object virtual coil pair 23. Therefore, for example, it is possible to arrange the base coils 12 so as to avoid the positions of the virtual specific coils 12A constituting the virtual coil pairs 23 of two phases, among the U phase, the V phase and the W phase, and it is possible to arrange the base coils 12 so as to avoid the positions of the virtual specific coils 12A constituting the virtual coil pairs 23 of all of the phases. Furthermore, it is also possible to arrange the base coils 12 so as to avoid only the positions of the virtual specific coils 12A constituting any one virtual coil pair 23, of a plurality of virtual coil pairs 23 of the same phase (for example, the V phase). In this case, the coil sides 21 of the upper layer coils 13 and the lower layer coils 14 are arranged at the positions of the coil sides 21a of all of the virtual specific coils 12A, where the arrangement of the base coils 12 is avoided.

Furthermore, in the sixth embodiment, the arrangement of the coils of the armature coil group 8 according to the fifth embodiment which include the base coils 12, the upper layer coils 13, the lower layer coils 14 and the additional coils 41, is applied to an armature core 7 having a number of slots Q=108, but the arrangement of coils of the armature coil group 8 in the first to ninth embodiments can be applied to an armature core 7 having a large number of slots. If the armature coil group 8 according to the fourth embodiment (an armature coil group 8 in a mode wherein the base coils 12 are arranged so as to avoid the positions of all of the virtual specific coils 12A and all of the virtual adjustment coils 12B) is applied to an armature core 7 with a large number of slots, then magnetic pole teeth 10 which are not spanned by the coil ends 22 occur corresponding to all of the virtual coil pairs 23, and therefore it is possible to split the armature core 7 having a large number of slots at the positions of all of the magnetic pole teeth 10 which are not spanned by the coil ends 22, similarly to the fourth embodiment, and the number of split cores 31 can be increased.

Furthermore, this invention is applied to a rotary electric machine 1 of an inner rotor type in which the rotor 4 is disposed inside the armature 2, but the invention is not limited to this, and may also be applied to a rotary electric machine of an outer rotor type in which the armature is disposed inside a cylindrical rotor. Furthermore, the invention may also be applied to a rotary electric machine of an axial gap type wherein the armature and the rotor oppose each other in the axis line direction, as well as a rotary electric machine of a radial gap type (inner rotor or outer rotor type) wherein the armature and the rotor oppose each other in the radial direction.

Furthermore, the rotary electric machine 1 according to each of the embodiments, can be applied to any one of an electric motor, an electric generator, or an electric motor-generator, for example. Moreover, the rotary electric machine 1 according to each of the embodiments described above can also be applied to a machine other than a synchronous machine, such as an induction machine.

The invention claimed is:

1. A rotary electric machine, comprising:
   an armature core having a plurality of magnetic pole teeth provided at intervals apart in a circumference direction, slots being formed between the magnetic pole teeth;
   an armature coil group having a plurality of armature coils each including a pair of coil sides arranged in the slots, which are different from one another, and coil ends connecting the pair of coil sides, the armature coils being wound on the magnetic pole teeth in an overlap winding configuration, and a three-phase current flowing in the armature coils; and
   a rotor having a plurality of magnetic poles aligned in the circumference direction, the rotor being rotated with respect to the armature core and the armature coil group,
   wherein the armature coil group has, as the armature coils, a plurality of base coils, of which one coil side is arranged in an upper opening of the slot and the other coil side is arranged in a lower opening of the slot, upper layer coils, of which both one coil side and the other coil side are arranged in an upper opening of the slot, and lower layer coils, of which both one coil side and the other coil side are arranged in the lower opening of the slot.

2. The rotary electric machine according to claim 1, wherein
   taking N to be a natural number equal to or greater than 2, the number of slots per pole q', which is the number of the slots for each of the magnetic poles, satisfies a relationship N<q' <N+1,
   the coil ends of the base coils span N+1 of the magnetic pole teeth in an inclined state in the same direction with respect to the circumference direction of the armature core,
   the coil ends of the upper layer coils and the lower layer coils span N of the magnetic pole teeth, and
   supposing a virtual base coil installation state in which the coil sides of a plurality of virtual base coils having the same configuration as the base coils are arranged in all of the upper openings and lower openings of the respective slots, two of the virtual base coils, which have a relationship whereby currents flowing in two of the coil sides which are respectively arranged in the upper openings of two of the slots situated on either side of the N of the magnetic pole teeth are currents of the same phase and opposite directions, are defined as virtual specific coils, and virtual coil pairs configured by the two virtual specific coils are created at uniform intervals in the circumference direction of the armature core,
   at least any one of the virtual coil pairs is taken as an object, and the base coils are arranged so as to avoid positions of all of the virtual specific coils constituting the virtual coil pair that is the object, and
   the coil sides of the upper layer coils and lower layer coils are arranged at positions of the coil sides of the virtual specific coils where the arrangement of the base coils has been avoided.

3. The rotary electric machine according to claim 2, wherein the base coils are arranged so as to avoid the positions of all of the virtual specific coils of the virtual coil pairs; and
   the coil sides of the upper layer coils and lower layer coils are arranged at the positions of the coil sides of all of the virtual specific coils where the arrangement of the base coils has been avoided.

4. The rotary electric machine according to claim 2, wherein, in a case where the greatest common divisor of the number of the slots Q in the armature core and the number of the magnetic poles P in the rotor is expressed as gcd(Q,P), an electrical angle range $\alpha°$ is expressed as $\alpha = 180 \times P/gcd\ (Q,P)$; and the virtual base coils situated between the virtual specific coils included in the virtual coil pairs are defined as virtual adjustment coils; then the base coils are arranged so as to avoid the virtual adjustment coils of each phase positioned within the scope of the electrical angle range $\alpha°$ ; and the coil sides of the upper layer coil and the lower layer coil are arranged at the positions of the coil sides of the virtual specific coils situated on either side of at least any one of the virtual adjustment coils where arrangement of the base coils has been avoided within the scope of the electrical angle range $\alpha°$.

5. The rotary electric machine according to claim 4, wherein the armature core is split into a plurality of split cores aligned in the circumference direction of the armature core; and a position of the boundary of the split cores is a position of a magnetic pole tooth which is not spanned by any of the armature coils.

6. The rotary electric machine according to claim 5, wherein the armature coil group further includes, as the armature coils, a plurality of additional coils which respectively create induced voltages that increase, in each phase, a size of combined vectors of induced voltages created by the base coils, the upper-layer coils and the lower-layer coils;

the coil sides of the additional coils are arranged at the positions of the coil sides of each of the virtual adjustment coils;

the coil ends of the additional coils are arranged so as to avoid the magnetic pole teeth which are not spanned by any of the upper layer coils, the lower layer coils and the base coils, in an inclined state in the opposite direction to the coil ends of the base coils, with respect to the circumference direction of the armature core; and the number of the magnetic pole teeth spanned by the coil ends of the additional coils is the same in each of the additional coils.

7. The rotary electric machine according to claim 5, wherein the armature coil group further includes, as the armature coils, a plurality of additional coils which respectively create induced voltages that increase, in each phase, a size of combined vectors of induced voltages created by the base coils, the upper-layer coils and the lower-layer coils;

the coil sides of the additional coils are arranged at the positions of the coil sides of each of the virtual adjustment coils;

the coil ends of the additional coils are arranged so as to avoid the magnetic pole teeth which are not spanned by any of the upper layer coils, the lower layer coils and the base coils, in an inclined state in the opposite direction to the coil ends of the base coils, with respect to the circumference direction of the armature core; and the number of the magnetic pole teeth spanned by the coil ends of the additional coils is the same in each of the additional coils.

\* \* \* \* \*